(12) United States Patent
Kawai

(10) Patent No.: US 11,194,748 B2
(45) Date of Patent: Dec. 7, 2021

(54) COMMUNICATION APPARATUS THAT SWITCHES A DRIVER FOR AN INTERFACE BASED ON A FREQUENCY BAND USED BY A WIRELESS COMMUNICATION UNIT, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/732,905

(22) Filed: Jan. 2, 2020

(65) Prior Publication Data

US 2020/0226086 A1     Jul. 16, 2020

(30) Foreign Application Priority Data

Jan. 11, 2019 (JP) .............................. JP2019-003612

(51) Int. Cl.
*G06F 3/00* (2006.01)
*G06F 13/38* (2006.01)
*H04W 4/80* (2018.01)
*G06F 13/42* (2006.01)

(52) U.S. Cl.
CPC .......... *G06F 13/385* (2013.01); *G06F 13/387* (2013.01); *G06F 13/4282* (2013.01); *H04W 4/80* (2018.02); *G06F 2213/0042* (2013.01)

(58) Field of Classification Search
CPC ....... H04L 67/10; H04L 67/42; H04L 67/125; H04L 2209/80
USPC .......................................................... 710/313
See application file for complete search history.

(56) References Cited

U.S. PATENT DOCUMENTS

| | | | |
|---|---|---|---|
| 7,006,451 B2 | 2/2006 | Kuwahara | |
| 9,491,770 B1 * | 11/2016 | Heninwolf | .......... H04W 72/082 |
| 10,028,312 B2 | 7/2018 | Kawai | |
| 2007/0297521 A1 * | 12/2007 | Guo | ..................... H04L 27/2657 375/260 |
| 2011/0268027 A1 * | 11/2011 | Nogawa | ................ H04W 48/18 370/328 |

(Continued)

FOREIGN PATENT DOCUMENTS

JP          2002198867 A        7/2002

*Primary Examiner* — Titus Wong
(74) *Attorney, Agent, or Firm* — Venable LLP

(57) ABSTRACT

This invention provides a communication apparatus including a wireless communication unit and an interface conforming to USB 3.0 standard, where the apparatus comprises a first determination unit which determines whether an external device has been connected to the interface; a second determination unit which determines a frequency band used in the wireless communication unit; a discrimination unit which, when it is determined that an external device has been connected to the interface, discriminates whether the frequency of noise generated in the communication with the external device causes interference with the frequency band of the wireless communication determined by the second determination unit; and a control unit which, if the discrimination result indicates that interfere is to be caused, performs control so as to communicate with the external device by driving the interface in accordance with the USB 2.0 standard.

11 Claims, 12 Drawing Sheets

(56) References Cited

U.S. PATENT DOCUMENTS

| | | | |
|---|---|---|---|
| 2014/0044113 A1* | 2/2014 | Chu | H04W 24/02 |
| | | | 370/338 |
| 2014/0185604 A1* | 7/2014 | Kil | H04W 48/20 |
| | | | 370/338 |
| 2014/0241406 A1* | 8/2014 | Yu | H04B 1/1027 |
| | | | 375/219 |
| 2014/0273860 A1* | 9/2014 | Hsu | H04B 15/00 |
| | | | 455/63.1 |
| 2014/0297899 A1* | 10/2014 | Chang | G06F 13/387 |
| | | | 710/14 |
| 2014/0348004 A1* | 11/2014 | Ponnuswamy | H04L 1/203 |
| | | | 370/242 |

* cited by examiner

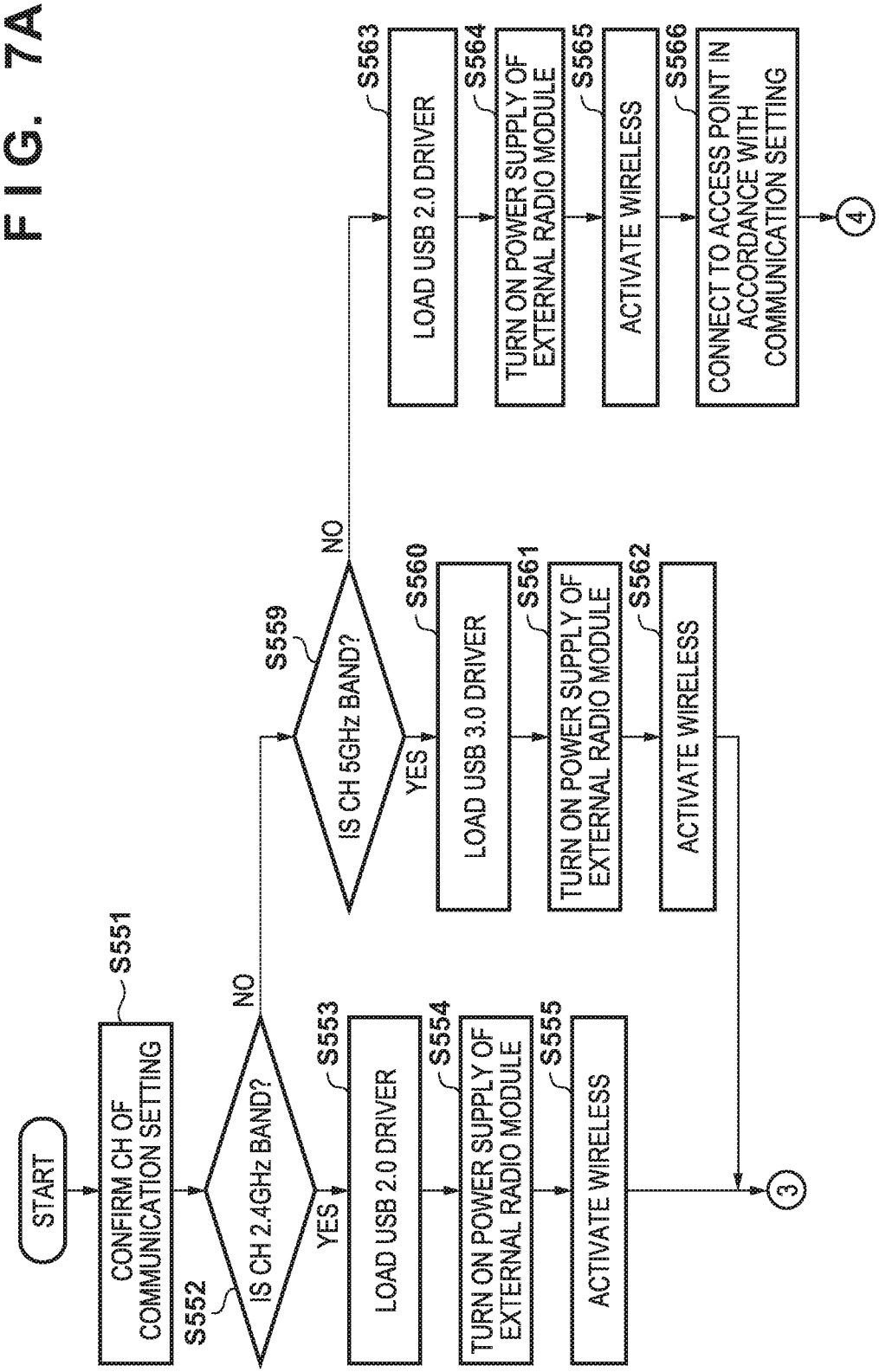

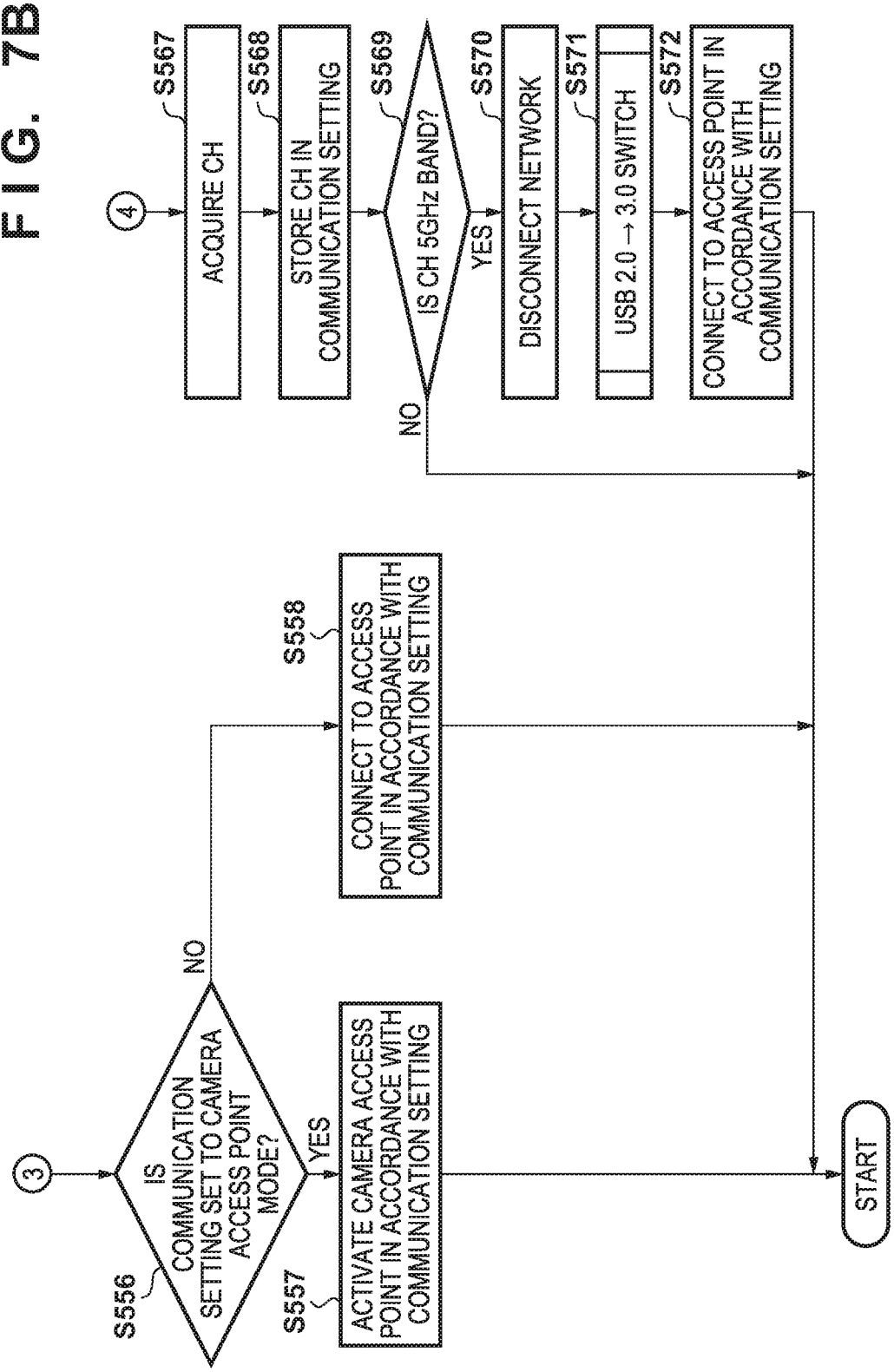

COMMUNICATION APPARATUS THAT SWITCHES A DRIVER FOR AN INTERFACE BASED ON A FREQUENCY BAND USED BY A WIRELESS COMMUNICATION UNIT, CONTROL METHOD THEREOF, AND NON-TRANSITORY COMPUTER-READABLE STORAGE MEDIUM

BACKGROUND OF THE INVENTION

Field of the Invention

The present invention relates to a communication apparatus, a control method thereof, and a non-transitory computer-readable storage medium.

Description of the Related Art

As a result of the recent high integration of wireless communication devices, wireless LAN is beginning to be installed not only in mobile personal computers (so-called notebook PCs), but also in printers, mobile information terminals, digital cameras, smart devices, smartphones, and the like. However, it is known that, as a result of the wireless LAN being influenced by interference from radio waves output from microwave ovens and other devices, the quality of wireless LAN communication decreases. For example, a communication apparatus for reducing the interference between Bluetooth (registered trademark) and the wireless LAN is disclosed in Patent Document: Japanese Patent Laid-Open No. 2002-198867.

Also, some communication apparatuses in which the wireless LAN is installed includes a USB (Universal Serial Bus) for enabling a wired connection with an external apparatus. It is known that, in the case of supporting USB 3.0 standard, when the USB is used at the same time as 2.4 GHz band wireless LAN, noise in the 2.5 GHz band frequency is generated from a connection cable with the external apparatus, or the like, which interferes with the wireless LAN, and the quality of the wireless LAN communication decreases. The solution is to arrange the USB connection unit and the wireless LAN communication unit separately from each other at a physically sufficient distance, but there is a problem in that such a distance cannot be secured because the casing of mobile communication apparatuses is small.

SUMMARY OF THE INVENTION

The present invention was achieved in light of the above-described problems, and provides a technique for reducing interference between the USB and the wireless communication.

According to a first aspect of the present invention, there is provided a communication apparatus including a wireless communication unit for performing wireless communication and an interface conforming to USB 3.0 standard, the communication apparatus comprising: a first determination unit configured to determine whether or not an external device has been connected to the interface; a second determination unit configured to determine a frequency band used in the wireless communication unit; a discrimination unit configured to, when the first determination unit has determined that an external device has been connected to the interface, discriminate whether the frequency of noise generated in the communication with the external device causes interference with the frequency band of the wireless communication determined by the second determination unit; and a control unit configured to, if the discrimination result of the discrimination unit indicates that interfere is to be caused, perform control so as to communicate with the external device by driving the interface in accordance with the USB 2.0 standard.

According to a second aspect of the present invention, there is provided a communication apparatus including an interface conforming to USB 3.0 standard, comprising: a processing unit configured to, when an external radio module has been connected to the interface, activate a wireless communication unit included in the external radio module via the interface by driving the interface using a USB 2.0 driver; a determination unit configured to determine a frequency band used by the wireless communication unit; and a control unit configured to discriminate, based on a determination result of the determination unit, whether driving of the interface is to be continued using the USB 2.0 driver or the driving of the interface is to be switched to driving using a USB 3.0 driver, and control the driving of the interface based on the discrimination result.

According to a third aspect of the present invention, there is provided a control method of a communication apparatus including a wireless communication unit for performing wireless communication and an interface conforming to USB 3.0 standard, the control method comprising: (a) determining whether or not an external device has been connected to the interface; (b) determining a frequency band used in the wireless communication unit; (c) discriminating whether, upon determining that an external device has been connected to the interface in the determining (a), the frequency of noise generated in the communication with the external device causes interference with the frequency band of the wireless communication determined in determining (b); and (d) controlling, if the discrimination result in the discriminating (c) indicates that interfere is to be caused, so as to communicate with the external device by driving the interface in accordance with the USB 2.0 standard.

According to a fourth aspect of the present invention, there is provided a control method of a communication apparatus including an interface conforming to USB 3.0 standard, the control method comprising: (a) activating, when an external radio module has been connected to the interface, a wireless communication unit included in the external radio module via the interface by driving the interface using a USB 2.0 driver; (b) determining a frequency band used by the wireless communication unit; and (c) discriminating, based on a determination result in the determining (b), whether driving of the interface is to be continued using the USB 2.0 driver or the driving of the interface is to be switched to driving using a USB 3.0 driver, and controlling the driving of the interface based on the result in the discriminating.

According to a fifth aspect of the present invention, there is provided a non-transitory computer-readable storage medium storing a program which, when read and executed by a computer, causes the computer to execute the steps of a control method of a communication apparatus including a wireless communication unit for performing wireless communication and an interface conforming to USB 3.0 standard, the control method comprising: (a) determining whether or not an external device has been connected to the interface; (b) determining a frequency band used in the wireless communication unit; (c) discriminating whether, upon determining that an external device has been connected to the interface in the determining (a), the frequency of noise generated in the communication with the external device causes interference with the frequency band of the wireless communication determined in determining (b); and (d) controlling, if the discrimination result in the discriminating (c) indicates that interfere is to be caused, so as to communicate with the external device by driving the interface in accordance with the USB 2.0 standard.

According to a sixth aspect of the present invention, there is provided a non-transitory computer-readable storage medium storing a program which, when read and executed by a computer, causes the computer to execute the steps of a control method of a communication apparatus including an interface conforming to USB 3.0 standard, the control method comprising: (a) activating, when an external radio module has been connected to the interface, a wireless communication unit included in the external radio module via the interface by driving the interface using a USB 2.0 driver; (b) determining a frequency band used by the wireless communication unit; and (c) discriminating, based on a determination result in the determining (b), whether driving of the interface is to be continued using the USB 2.0 driver or the driving of the interface is to be switched to driving using a USB 3.0 driver, and controlling the driving of the interface based on the result in the discriminating.

According to the present invention the interference between the USB and the wireless communication can be reduced.

Further features of the present invention will become apparent from the following description of exemplary embodiments (with reference to the attached drawings).

BRIEF DESCRIPTION OF THE DRAWINGS

FIGS. 7A and 7B are flowcharts illustrating processing when wireless LAN connection is performed in accordance with SET information in the digital camera of the second embodiment.

DESCRIPTION OF THE EMBODIMENTS

Figure 1A:
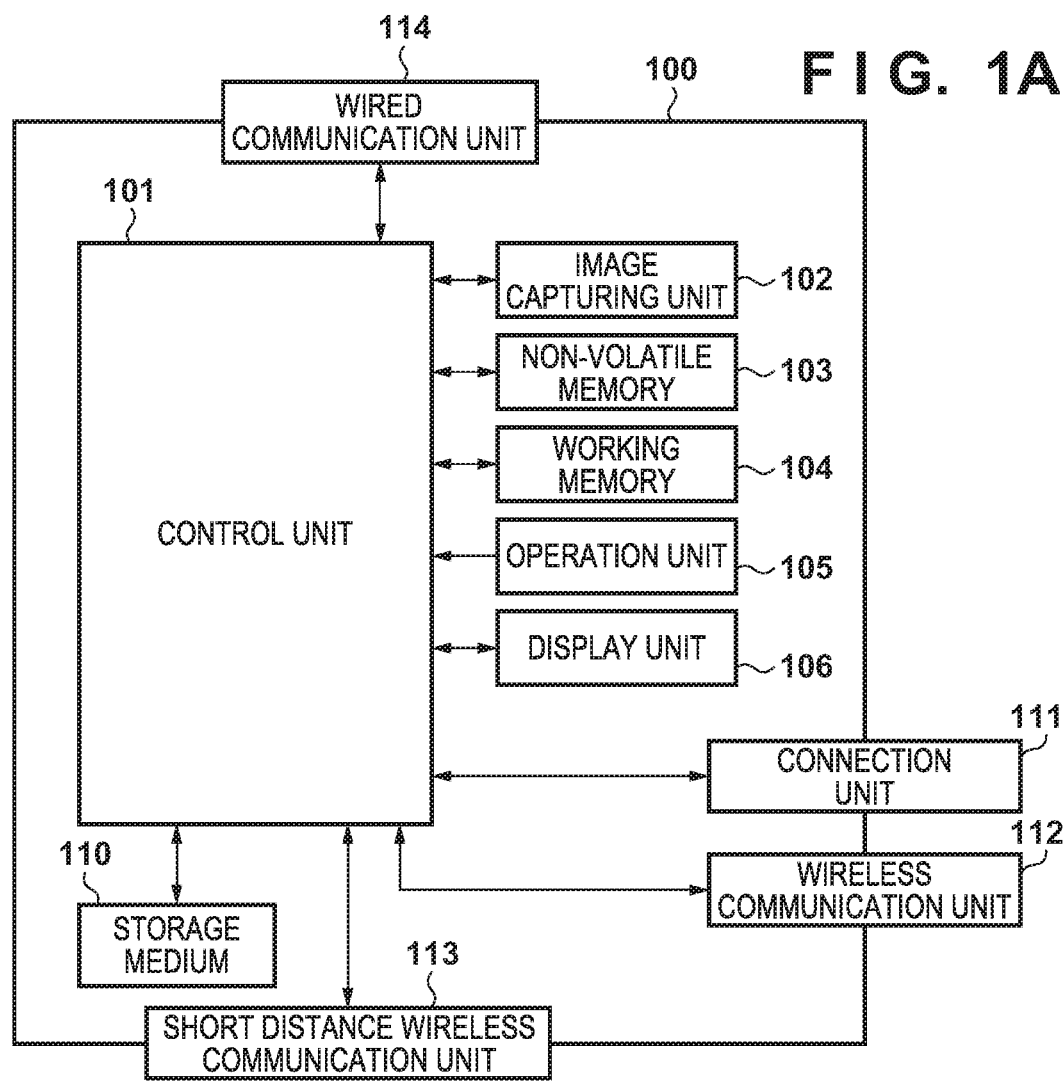
FIGS. 1A to 1C are diagrams illustrating a configuration of a digital camera in a first embodiment.

Hereinafter, embodiments will be described in detail with reference to the attached drawings. Note that the following embodiments are not intended to limit the invention according to the claims. Although the embodiments describe a plurality of features, not all of these features are necessarily essential for the invention, and the features may also be combined in any manner. Furthermore, in the attached drawings, the same or similar constituent elements are assigned the same reference numerals, and redundant descriptions are omitted.

Also, first and second embodiments described below illustrate an example in which the present invention is applied to a digital camera, which serves as a communication apparatus, but the communication apparatus is not limited thereto. For example, the communication apparatus may be an information processing apparatus such as a mobile media player, a so-called tablet device, or a personal computer. It should be understood that this is merely an example.

First Embodiment

Internal Configuration of Digital Camera 100

FIG. 1A is a block diagram illustrating an exemplary configuration of a digital camera 100 serving as a communication apparatus to which the first embodiment is applied.

A control unit 101 includes one or more CPUs, and controls the units of the digital camera 100 according to an input signal and a later-described program. Note that, instead of the control unit 101 controlling the entire apparatus, the entire apparatus may be controlled by a plurality of hardware items sharing processing.

An image capturing unit 102 is constituted by an optical lens unit, an optical system that controls a diaphragm, zooming, and focusing, an image sensor that converts light (video) that has been introduced via the optical lens unit to an electric video signal, and the like, for example. A CMOS (Complementary Metal Oxide Semiconductor) or a CCD (Charge Coupled Device) is used, in general, as the image sensor. The image capturing unit 102, under the control of the control unit 101, converts subject light with which an image is formed by a lens included in the image capturing unit 102 to an electric signal using the image sensor, performs noise reduction processing and the like, and outputs digital data as the image data. In the digital camera 100 of the present embodiment, the image data obtained by capturing is recorded in a recording medium 110 in accordance with the DCF (Design Rule for Camera File system) standard.

A non-volatile memory 103 is an electrically erasable and recordable non-volatile memory, and stores a later-described program that is executed by the control unit 101 and the like.

A working memory 104 is used as a buffer memory for temporarily storing data of an image captured by the image capturing unit 102, an image display memory for a display unit 106, a work area for the control unit 101, and the like.

An operation unit 105 is provided for a user to perform various instruction inputs to the digital camera 100, and notifies the control unit 101 of the instruction input made by the user. The operation unit 105 includes a power button for the user to instruct power on/off of the digital camera 100, a release button for making a shooting instruction, and a reproduction button for making an instruction to reproduce an image from image data, for example. The operation unit 105 further includes operation members such as a dedicated connection button for starting communication with an external apparatus via a later-described communication unit 111. Also, a touch panel formed in the later-described display unit 106 is included in the operation unit 105. Note that the release switch includes switches SW1 and SW2. When the release button enters a so-called halfway-pressed state, the SW1 is turned on. Accordingly, an instruction for performing a shooting preparation such as AF (autofocus) processing, AE (auto-exposure) processing, AWB (automatic white balance) processing, and EF (pre-flashing) processing is accepted. Also, as a result of the release button entering a so-called fully-pressed state, the SW2 is turned on. Accordingly, an instruction for performing shooting is received.

The display unit 106 displays a view finder image at the time of shooting, displays shot image data, displays text characters for interactive operation, and the like. Note that the display unit 106 need not be incorporated in the digital camera 100. It is sufficient that the digital camera 100 can connect to an internal or external display unit 106, and include at least a display control function for controlling display of the display unit 106.

The recording medium 110 can store image data that has been output from the image capturing unit 102. The recording medium 110 may be attached to and detached from the digital camera 100, or may be incorporated in the digital camera 100. The digital camera 100 needs only to include at least means for accessing the recording medium 110.

The connection unit 111 is an interface for connecting to an external apparatus. The connection unit 111 has various communication functions such as USB, IEEE 1394, P1284, SCSI, modem, LAN, RS232C, and wireless communication. A connector for connecting the digital camera 100 to the external apparatus or an antenna when providing a wireless communication function may be connected to the connection unit 111. The digital camera 100 of the present embodiment can exchange data with the external apparatus via the connection unit 111. For example, image data generated by the image capturing unit 102 can be transmitted to the external apparatus via the connection unit 111. Note that, in the present embodiment, the connection unit 111 includes an interface for communicating with the external apparatus with the USB, and is an interface conforming to USB 3.0 standard. The interface conforming to the USB 3.0 standard is backward (USB 2.0) compatible, and can also function as the USB 2.0 standard. The control unit 101 realizes USB communication with the external apparatus by controlling the connection unit 111.

A wireless communication unit 112 is an internal interface for wirelessly connecting to an external apparatus. The digital camera 100 of the present embodiment can exchange data with the external apparatus via the wireless communication unit 112. Note that, in the present embodiment, the wireless communication unit 112 includes an interface for communicating with the external apparatus using the wireless LAN, and is compatible with frequency bands of a 2.4 GHz band and a 5 GHz band. The control unit 101 realizes wireless communication with the external apparatus by controlling the wireless communication unit 112.

A short distance wireless communication unit 113 is constituted by an antenna for wireless communication, a modulation/demodulation circuit for processing a wireless signal, and a communication controller, for example. The short distance wireless communication unit 113 realizes short distance wireless communication with an external apparatus in conformity with the IEEE802.15 standard (so-called Bluetooth (registered trademark)) by outputting a modulated wireless signal from the antenna and demodulating a wireless signal received by the antenna. In the present embodiment, the Bluetooth (registered trademark) communication employs Bluetooth (registered trademark) Low Energy version 4.0, which is a low power consumption version. This Bluetooth (registered trademark) communication has a narrower communicable range than the wireless LAN communication (that is, the communicable distance is shorter). Also, the Bluetooth (registered trademark) communication has slower communication speed than the wireless LAN communication. On the other hand, the Bluetooth (registered trademark) communication consumes less power than the wireless LAN communication. The digital camera 100 of the present embodiment can exchange data with the external apparatus via the short distance wireless communication unit 113. For example, the digital camera 100, in the case of receiving a shooting instruction from the external apparatus, controls the image capturing unit 102 so as to perform a shooting operation, and in the case of receiving an instruction to exchange data using wireless LAN communication, controls the wireless communication unit 112 so as to start the wireless LAN communication.

A wired communication unit 114 is an interface for connecting to an external apparatus by wire. The digital camera 100 of the present embodiment can exchange data with the external apparatus via the wired communication unit 114. Note that, in the present embodiment, the wired communication unit 114 includes an interface for communicating with the external apparatus with the wired LAN. The control unit 101 realizes wired communication with the external apparatus by controlling the wired communication unit 114. Note that the communication method is not limited to the wired LAN.

Note that the wireless communication unit 112 of the digital camera 100 in the present embodiment has an AP mode in which the wireless communication unit 112 operates as an access point in an infrastructure mode, and a client mode (hereinafter, CL mode) in which the wireless communication unit 112 operates as a client in the infrastructure mode. As a result of causing the wireless communication unit 112 to operate in the CL mode, the digital camera 100 in the present embodiment can operate as a CL device in the infrastructure mode. When the digital camera 100 operates as the CL device, as a result of connecting to a nearby AP device, the digital camera 100 can join the network formed by the AP device. Also, as a result of causing the wireless communication unit 112 to operate in the AP mode, the digital camera 100 in the present embodiment can also operate as a simplified AP, which is a type of AP and has limited functionality. When the digital camera 100 operates as the simplified AP, the digital camera 100 forms a network on its own. An apparatus that is in the vicinity of the digital camera 100 can recognize the digital camera 100 as the AP device, and join the network formed by the digital camera 100. The program for causing the digital camera 100 to operate as described above is stored in the non-volatile memory 103.

Note that the digital camera 100 in the present embodiment, although being a type of AP, is a simplified AP that does not have a gateway function of transferring data received from a CL device to an interne provider or the like. Accordingly, even if the digital camera 100 receives data from another apparatus that has joined the network formed by the digital camera 100, the data cannot be transferred to a network such as the Internet.

Figure 1B:
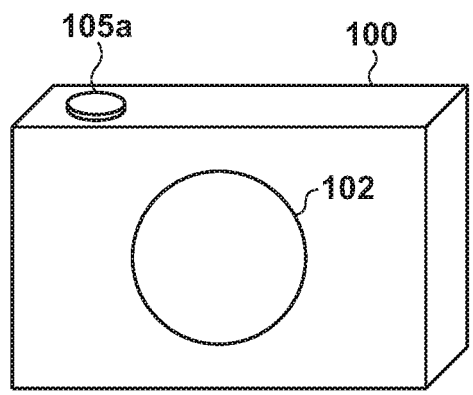
Figure 1C:
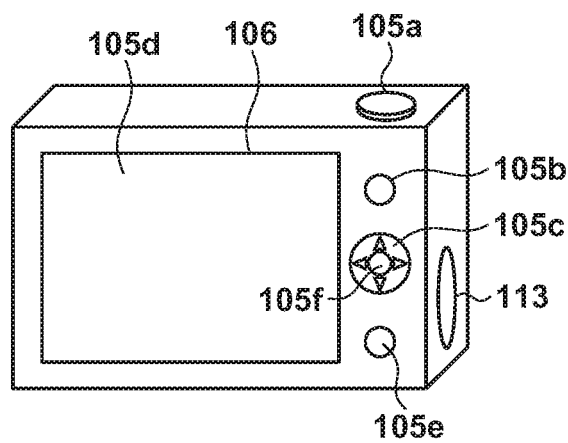

Next, the external appearance of the digital camera 100 will be described. FIG. 1B is a front perspective view of the digital camera 100, and FIG. 1C is a rear perspective view of the digital camera 100. A release button 105a, a reproduction button 105b, a directional key 105c, a touch panel 105d, a menu button 105e, and a determination button 105f are operation members included in the operation unit 105 described above. The menu button 105e is a button for displaying an operation menu screen of the digital camera 100. When the menu button is pressed in a state in which the menu screen is displayed, the user can exit the menu or return to the previous screen. The directional key 105c is a button for changing a selected option (item, image), of a plurality of options, such as a cursor. Also, the directional key 105c is also used to display an image previous to or following the image under display. Also, an image obtained by the capturing performed by the image capturing unit 102 is displayed in the display unit 106.

The configuration of the digital camera 100 in the embodiment has been described above.

Processing when USB communication with external apparatus and wireless LAN communication are used at the same time The processing when the digital camera 100 in the embodiment uses the USB communication with an external apparatus and the wireless LAN communication at the same time will be described with reference to FIGS. 2, 3A and 3B.

Figure 2:
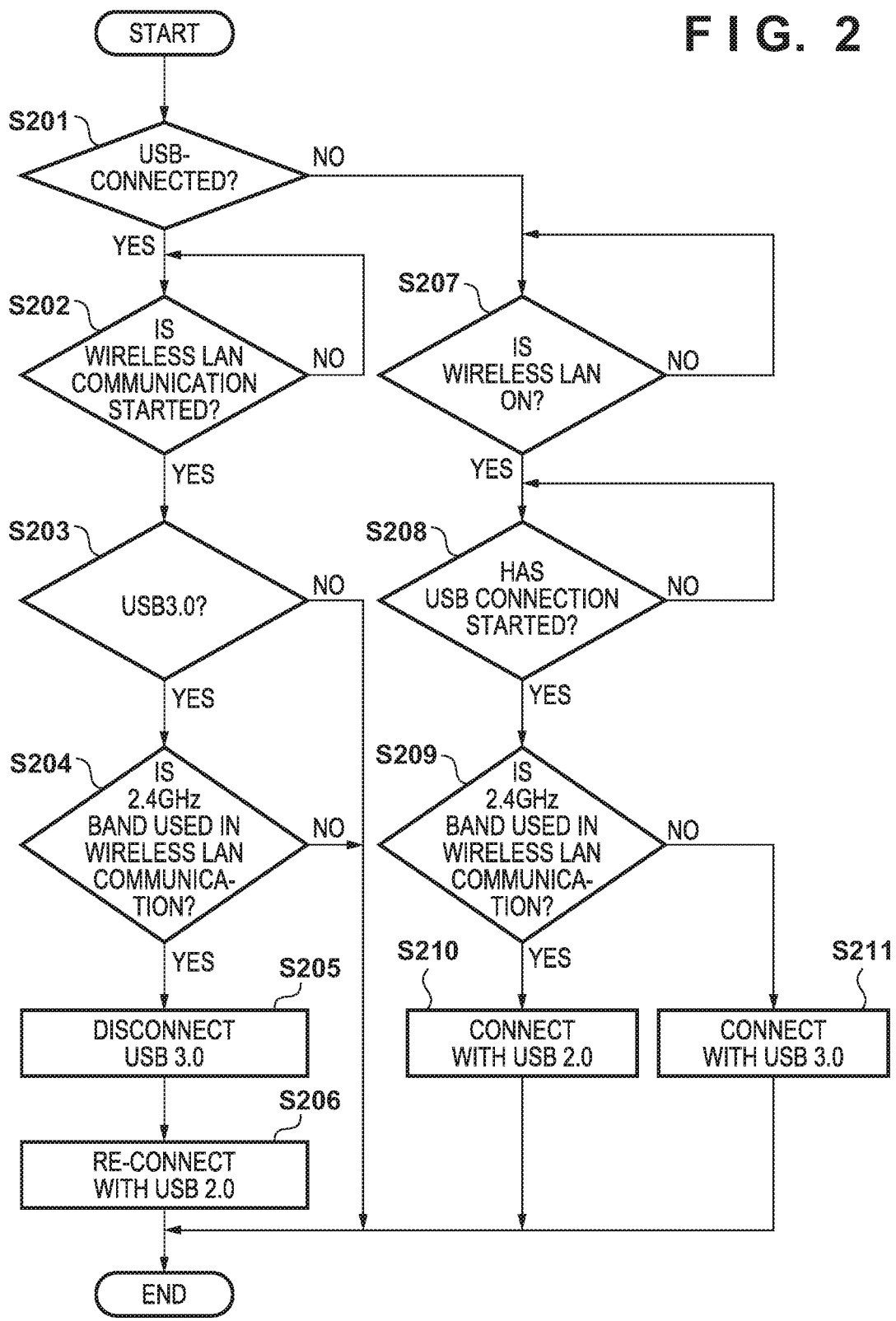
FIG. 2 is a flowchart illustrating processing for performing USB communication and wireless LAN communication at the same time in the digital camera in the first embodiment.
Figure 3A:
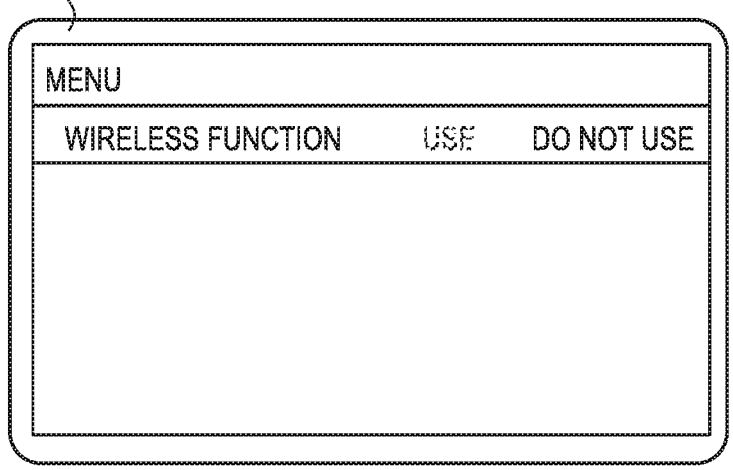
FIGS. 3A and 3B are diagrams illustrating a screen to be displayed when the wireless LAN communication is performed in the digital camera in the first embodiment.
Figure 3B:
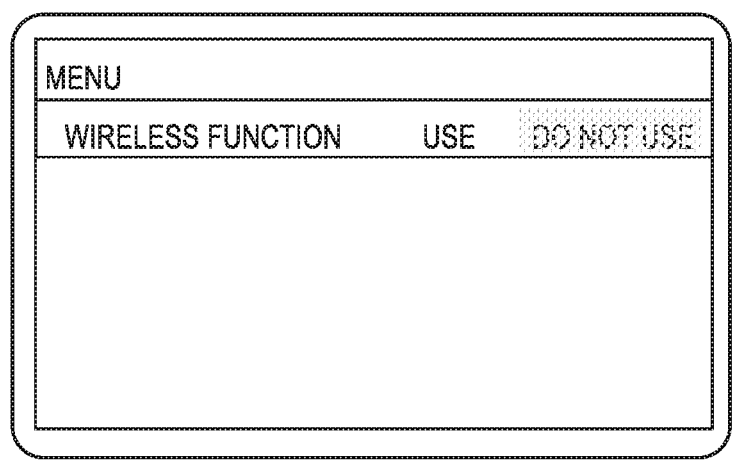

FIG. 2 is a flowchart of monitoring processing when, in the digital camera 100 in the present embodiment, the USB communication with the external apparatus and the wireless LAN communication are used at the same time. Each processing in the flowchart is realized by the control unit 101 extracting a program stored in the non-volatile memory 103 to the working memory 104 and executing the program. FIGS. 3A and 3B are diagrams illustrating screens to be displayed in the display unit 106, in the digital camera 100 in the present embodiment, when the wireless LAN connection is performed. In the present embodiment, the digital camera 100 is assumed to connect to the external apparatus as a USB device. Also, it is assumed that, in the present embodiment, the external apparatus that performs USB communication with the digital camera 100 supports the USB 3.0. Note that the processing relating to actual information communication with the external device (transferring captured image data to the external apparatus, for example) is executed by another processing that is executed in parallel, and the description thereof will be omitted.

In step S201, the control unit 101 determines (or discriminates) whether or not the digital camera 100 is USB-connected to the external apparatus by controlling the connection unit 111. In step S201, the control unit 101, upon determining that the digital camera 100 is USB-connected to the external apparatus, advances the processing to step S202, and upon determining that there is no USB connection, advances the processing to step S207.

First, the processing when the discrimination result in step S201 indicates USB connection with the external apparatus will be described. In this case, in step S202, the control unit 101 determines whether or not a user started wireless LAN communication. For example, when the user changed the wireless function from the state of "DON'T USE" in the menu shown in FIG. 3A to a state of "USE" in FIG. 3B, the wireless LAN communication is started. In the present embodiment, when the wireless LAN communication is started, the control unit 101 performs the wireless LAN communication based on a communication setting, which is stored in the storage medium 110, including wireless parameters such as an SSID (Service Set IDentifier) and an encryption key. In step S202, the control unit 101, upon determining that the wireless LAN communication is started, advances the processing to step S203, and upon determining that the wireless LAN communication is not started, returns the processing to step S202. Then, the control unit 101, upon determining that wireless LAN communication is started, performs the wireless LAN communication by controlling the wireless communication unit 112 based on the communication setting stored in the storage medium 110.

Next, in step S203, the control unit 101 determines whether or not the connection, in the connection unit 111, to the external apparatus is with the USB 3.0. In step S203, the control unit 101, upon determining that the connection is with the USB 3.0, advances the processing to step S204. Also, the control unit 101, upon determining that the connection is not with the USB 3.0, that is, the connection is with the USB 2.0, ends this processing. That is, the control unit 101 continues the wireless LAN communication and the communication using the USB 2.0.

Next, in step S204, the control unit 101 determines whether or not a 2.4 GHz band is used in the wireless LAN communication started in step S202. In step S204, the control unit 101, upon determining that the wireless LAN communication uses the 2.4 GHz band, advances the processing to step S205. Also, the control unit 101, upon determining that the wireless LAN communication is not using the 2.4 GHz band, that is, the 5 GHz band is used, ends the processing. That is, the control unit 101 allows the wireless LAN communication (5 GHz band) and the USB 3.0 communication, as requested by the user.

In step S205, the control unit 101 disconnects the USB 3.0 communication with the external apparatus by controlling the connection unit 111, and advances the processing to step S206. In step S206, the control unit 101 performs re-connection to the external apparatus by performing re-driving with the USB 2.0, by controlling the connection unit 111, and ends this processing.

It is possible to connect to an external apparatus that supports the USB 3.0 with the USB 2.0 by starting USB connection after writing USB 2.0 in a bcdUSB field of a USB device descriptor. The external apparatus realizes that the digital camera 100 attempts to establish connection with the USB 2.0 in enumeration, and establishes the USB connection with the digital camera 100 with the USB 2.0. When the connection with the USB 2.0 is established, the digital camera 100 can perform simultaneous processing of wireless LAN communication (2.4 GHz band) and USB 2.0 communication. Note that, after re-connection to the external apparatus is performed in step S205, the control may be such that the wireless LAN communication is automatically started, similarly to step S202, using the wireless parameters again that were used when the wireless LAN communication was started in step S202. In this way, the time and effort for inputting an instruction for starting the wireless LAN communication again can be saved.

Next, the processing when the control unit 101 determines that the digital camera 100 is not USB-connected to the external apparatus in step S201 will be described. In step S207, the control unit 101 determines whether or not the wireless LAN communication is performed, using the wireless communication unit 112. In step S207, the control unit 101, upon determining that the wireless LAN communication is being performed, advances the processing to step S208, and upon determining that wireless LAN communication is not performed, returns the processing to step S207.

Next, in step S208, the control unit 101 determines whether or not USB connection with the external apparatus has been started, by controlling the connection unit 111. In step S208, the control unit 101, upon determining that the USB connection has been started, advances the processing to step S209, and upon determining that the USB connection has not been started, returns the processing to step S208.

In step S209, the control unit 101 determines whether or not the 2.4 GHz band is used in the wireless LAN communication. In step S209, the control unit 101, upon determining that the 2.4 GHz band is used in the wireless LAN communication, advances the processing to step S210, and upon determining that the 2.4 GHz band is not used, that is, the 5 GHz band is used, advances the processing to step S211.

In step S210, the control unit 101 performs processing so as to USB-connect to the external apparatus using the USB 2.0, by controlling the connection unit 111, and ends this processing. As a result, communication using both of the wireless LAN communication using the 2.4 GHz band and the USB 2.0 communication is made possible. It is possible to connect to an external apparatus that supports the USB 3.0 with the USB 2.0 by starting USB connection after writing USB 2.0 in the bcdUSB field of the USB device descriptor. The external apparatus realizes that the digital camera 100 attempts to establish connection with the USB 2.0 in enumeration, and establishes the USB connection with the digital camera 100 with the USB 2.0.

In step S211, the control unit 101 USB-connects to the external apparatus using the USB 3.0 by controlling the connection unit 111, and ends this monitoring processing. As a result, communication using both of the wireless LAN communication using the 5 GHz band and the USB 3.0 communication is made possible. It is possible to connect to an external apparatus with the USB 3.0 by starting USB connection after writing USB 3.0 in the bcdUSB field of the USB device descriptor. The external apparatus realizes that the digital camera 100 attempts to establish connection with the USB 3.0 in enumeration, and establishes the USB connection with the digital camera 100 with the USB 3.0.

The processing flow when the USB communication with an external apparatus and the wireless LAN communication are performed at the same time in the digital camera 100 in the embodiment has been described above.

According to the present embodiment as described above, in a situation in which wireless LAN communication is started in a state in which USB connection has been already established with an external apparatus, if the USB communication is with the USB 3.0 and the wireless LAN communication is in the 2.4 GHz band, the USB communication is switched from the USB 3.0 to the USB 2.0. As a result, generation of noise in the 2.5 GHz band from a communication cable between the connection unit 111 and the external apparatus, or the like, can be suppressed, and the interference of the USB to the wireless LAN can be reduced. Also, when the USB connection is started in a state in which wireless LAN communication has been already performed, connection with the external apparatus is performed with the USB 2.0 if the wireless LAN communication is in the 2.4 GHz band, and with the USB 3.0 if the wireless LAN communication is in the 5 GHz band, and as a result, interference between the USB and the wireless LAN can be reduced.

Note that, in the present embodiment, the configuration is such that, in step S203 in FIG. 2, if it is determined that USB connection is performed with the USB 2.0, the processing is ended, and the wireless LAN communication and the USB 2.0 communication are to be continued, but the configuration may be such that if the wireless LAN communication is in the 5 GHz band, switching is performed from the USB 2.0 to the USB 3.0. As a result of adopting such a configuration, high-speed USB communication can be performed while reducing the interference between the USB and the wireless LAN. Also, the configuration may be such that, when the wireless LAN communication is started in a state in which USB connection with the external apparatus has already been established, if the USB communication is with the USB 2.0, the wireless LAN communication can be started in either the 2.4 GHz band or the 5 GHz band, and if the USB communication is with the USB 3.0, only the wireless LAN communication in the 5 GHz band can be started. As a result of configuring in this way, the USB switching processing need not be performed.

Second Embodiment

Next, a case where an external radio module is connected to a digital camera, and the USB is used as the interface between the digital camera and the external radio module will be described as a second embodiment.

Internal Configuration of Digital Camera

Figure 4:
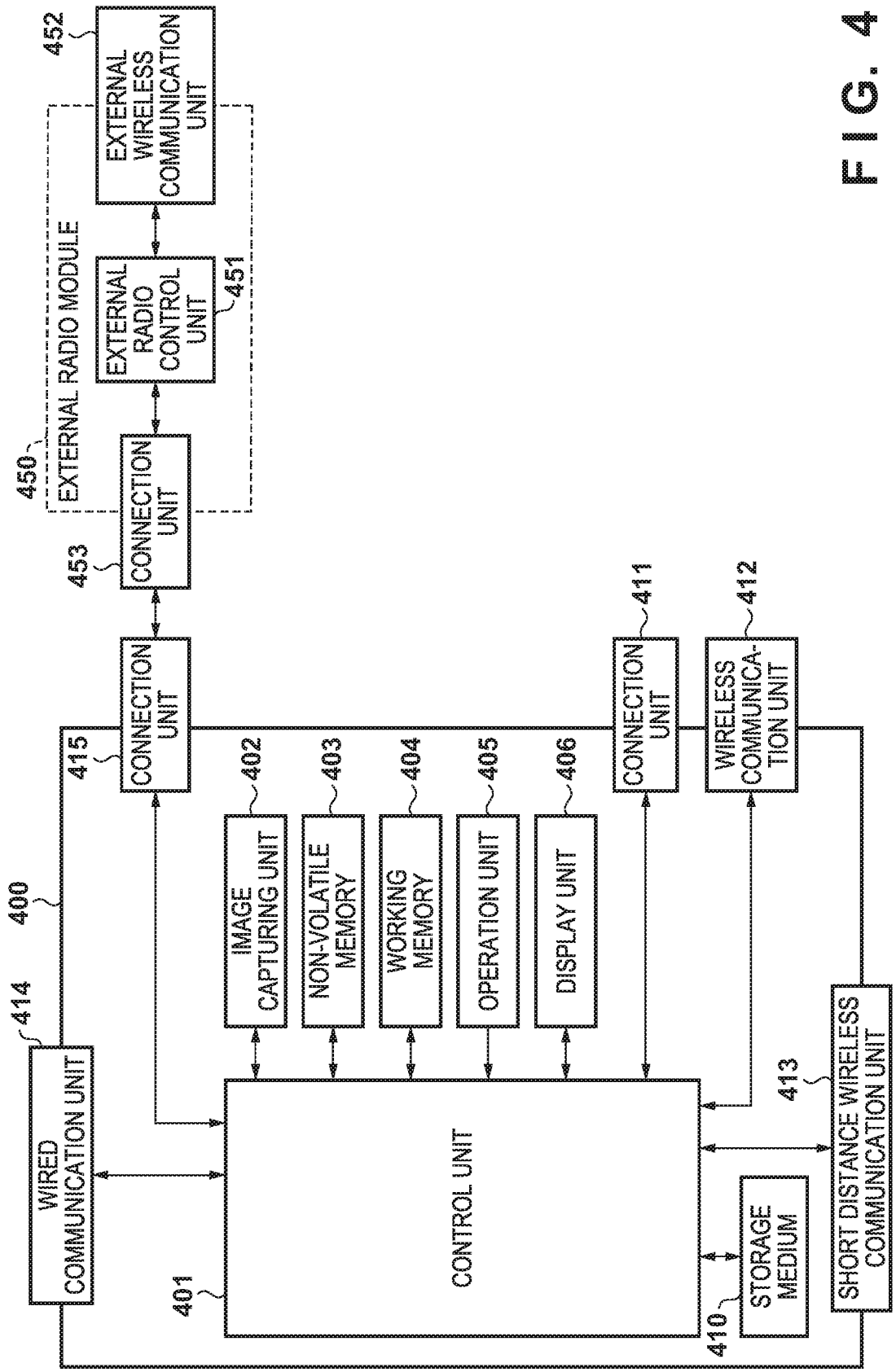
FIG. 4 is a block configuration diagram of a digital camera in a second embodiment.

FIG. 4 is a block diagram illustrating an exemplary configuration of a digital camera 400 in the present second embodiment. Note that, here, the digital camera will be described as an example of the communication apparatus, but the communication apparatus is not limited thereto. For example, the communication apparatus may be a mobile media player, or an information processing apparatus such as a so-called tablet device or a personal computer.

A control unit 401, an image capturing unit 402, a non-volatile memory 403, a working memory 404, an operation unit 405, a display unit 406, and a recording medium 410 in FIG. 4 are respectively the same as the control unit 101, the image capturing unit 102, the non-volatile memory 103, the working memory 104, the operation unit 105, the display unit 106, and the recording medium 110 in FIG. 1, and therefore the description of the functions are omitted.

The connection unit 411 is an interface for connecting to an external apparatus. The connection unit 411 has various communication functions such as USB, IEEE 1394, P1284, SCSI, modem, LAN, RS232C, and wireless communication. A connector for connecting the digital camera 400 to the external apparatus or an antenna when providing a wireless communication function may be connected to the connection unit 411. The digital camera 400 of the present embodiment can exchange data with the external apparatus via the connection unit 411. For example, image data generated by the image capturing unit 402 can be transmitted to the external apparatus via the connection unit 411. Note that, in the present embodiment, the connection unit 411 includes an interface for communicating with an external apparatus with the USB, and is compatible with the USB 3.0 and the USB 2.0. Note that the connection unit 411 need not be incorporated in the digital camera 400. It is sufficient that the digital camera 400 can include a connection control function for connecting to an internal or external connection unit 411 and for controlling the connection unit 411. The control unit 401 realizes USB communication with the external apparatus by controlling the connection unit 411. Note that the communication method is not limited to the USB.

A wireless communication unit 412 is an interface for wirelessly connecting to an external apparatus. The digital camera 400 of the present embodiment can exchange data with the external apparatus via the internal wireless communication unit 412. Note that, in the present embodiment, the internal wireless communication unit 412 includes an interface for communicating with an external apparatus with the wireless LAN. The control unit 401 realizes wireless communication with the external apparatus by controlling the internal wireless communication unit 412. Note that the communication method is not limited to the wireless LAN.

A short distance wireless communication unit 413 and a wired communication unit 414 are respectively the same as the short distance wireless communication unit 113 and the wired communication unit 114 in FIG. 1, and therefore the description thereof is omitted.

A connection unit 415 is an interface for connecting the digital camera 400 and an external radio module 450. The digital camera 400 of the present embodiment communicates with the external radio module 450 via the connection unit 415, and can exchange data with an external apparatus via the external radio module 450. In the present embodiment, the connection unit 415 includes an interface for communicating with the USB, and is compatible with the USB 3.0 and the USB 2.0. Note that the external radio module 450 may be detachable, and the external radio module 450 may be attached when used.

An external radio control unit 451 controls the units of the external radio module 450 in accordance with an input signal and a later-described program. Note that, instead of the external radio control unit 451 controlling the entire external radio module, the entire external radio module 450 may be controlled by a plurality of hardware items sharing processing.

An external wireless communication unit 452 is an interface for wirelessly connecting to an external apparatus. The external radio module 450 of the present embodiment can exchange data with the external apparatus via the external wireless communication unit 452. Note that, in the present embodiment, the external wireless communication unit 452 includes an interface for communicating with an external apparatus with the wireless LAN, and is compatible with both of the 2.4 GHz band and 5 GHz band. The external radio control unit 451 realizes wireless communication with the external apparatus by controlling the external wireless communication unit 452. Note that the communication method is not limited to the wireless LAN.

A connection unit 453 is an interface for connecting the external radio module 450 and the digital camera 400. The external radio module 450 of the present embodiment communicates with the digital camera 400 via the connection unit 453, and exchanges data with an external apparatus under the control of the digital camera 400. In the present embodiment, the connection unit 453 includes an interface for communicating with the USB, and is compatible with the USB 3.0 and the USB 2.0.

Note that the digital camera 400 in the present embodiment can select and use one of the internal wireless communication unit 412, the wired communication unit 414, and the external wireless communication unit 452 when exchanging data with an external apparatus. Also, a configuration may be adopted in which these communication units can be used at the same time.

Also, the external wireless communication unit 452 of the external radio module 450 connected to the digital camera 400 in the present embodiment has an AP mode in which the external wireless communication unit 452 operates as an access point in an infrastructure mode, and a CL mode in which the external wireless communication unit 452 operates as a client in the infrastructure mode. As a result of causing the external wireless communication unit 452 to operate in the CL mode, the digital camera 400 in the present embodiment can operate as a CL device in the infrastructure mode. When the digital camera 400 operates as the CL device, as a result of connecting to a nearby AP device, the digital camera 400 can join the network formed by the AP device. Also, as a result of causing the external wireless communication unit 452 to operate in the AP mode, the digital camera 400 in the present embodiment can also operate as a simplified AP (hereinafter, camera access point), which is a type of AP and has limited functionality. When the digital camera 400 operates as the camera access point, the digital camera 400 forms a network on its own. An apparatus that is in the vicinity of the digital camera 400 can recognize the digital camera 400 as the AP device, and join the network formed by the digital camera 400. The program for causing the digital camera 400 to operate as described above is stored in the non-volatile memory 403.

Note that the digital camera 400 in the present embodiment, although being a type of AP, is a simplified AP that does not have a gateway function of transferring data received from a CL device to an internet provider or the like. Accordingly, even if the digital camera 400 receives data from another apparatus that has joined the network formed by the digital camera 400, the data cannot be transferred to a network such as the Internet.

The configuration of the digital camera 400 in the second embodiment has been described above.

Next, the processing when wireless LAN connection is performed using the external radio module 450, in the configuration of the digital camera 400 shown in FIG. 4, will be described with reference to FIGS. 5A to 7B and 8A to 8I.

Processing in Wizard

First, the processing when performing wireless LAN connection through a connection wizard of an external device using the external radio module 450, in the digital camera 400, will be described with reference to FIGS. 5A, 5B, 6, and 8A to 8I. The connection wizard in the present embodiment means that the communication setting including wireless parameters such as SSID and CH and IP addressing information, and the function setting including information regarding the connection partner device such as UUID are set while performing connection. Upon completing the connection with the connection partner device, the combination of the communication setting and the function setting is stored in the non-volatile memory 403 as SET.

Figure 5A:
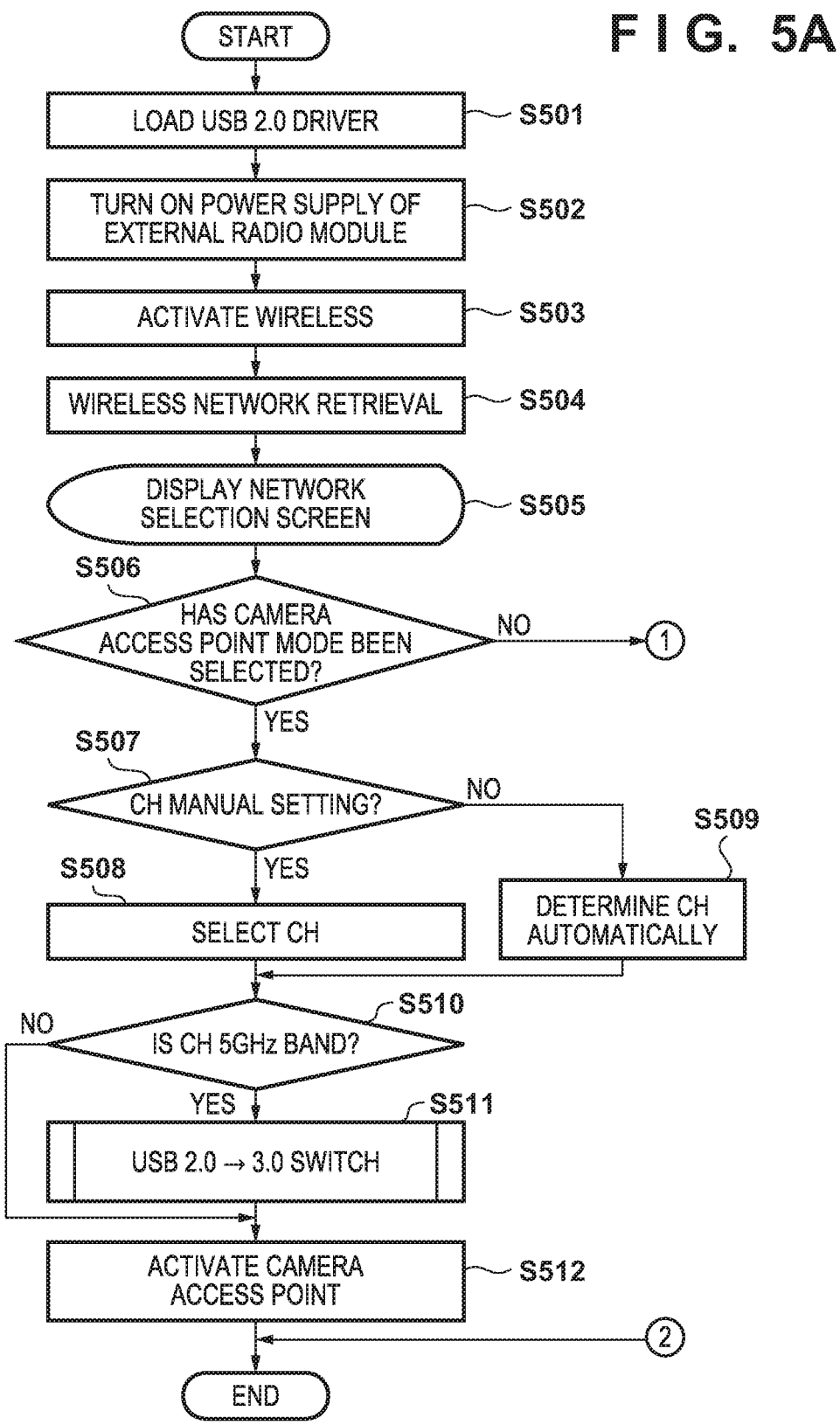
FIGS. 5A and 5B are flowcharts illustrating processing when wireless LAN connection is performed using a connection wizard in the digital camera of the second embodiment.

FIGS. 5A and 6B are flowcharts of the processing when performing wireless LAN connection through the connection wizard using the external radio module 450 in the digital camera 400 of the present embodiment. Each processing in the flowchart is realized by the control unit 401 extracting a program stored in the non-volatile memory 403 to the working memory 404 and executing the program. FIGS. 8A to 8I are diagrams illustrating screens to be displayed in the display unit 406, in the digital camera 400 in the present embodiment, when the wireless LAN connection is performed.

Figure 8A:
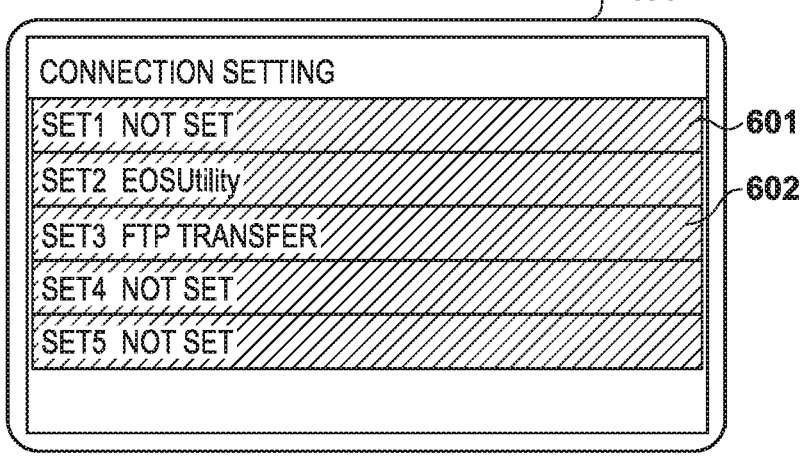
FIGS. 8A to 8I are diagrams illustrating exemplary screens that are displayed when wireless LAN connection is performed in the digital camera of the second embodiment.
Figure 8B:
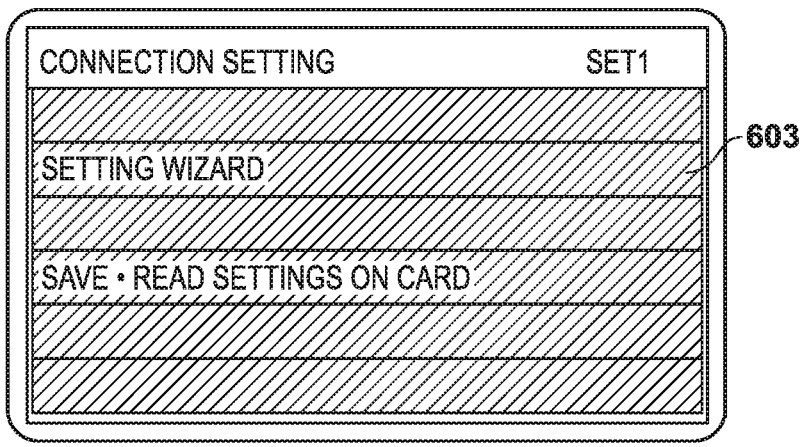

When a user has started the connection setting, the control unit 401 displays the screen shown in FIG. 8A in the display unit 406. FIG. 8A shows a list of the connection settings, and a plurality of items (SET1 to SET5 in the diagram) that the user can select via the operation unit are shown. When the SET, which is a combination of the communication setting and the function setting, is stored, a function name ("FTP transfer" in the diagram) is displayed as shown in SET3 indicated by a reference sign 602, and when the SET is not stored, "not set" is displayed as shown in SET1 indicated by a reference sign 601. Upon detecting that the user has selected the SET1 indicated by the reference sign 601, the control unit 401 displays the screen in FIG. 8B in the display unit 406. Here, if the control unit 401 determines that the "connection wizard" indicated by a reference sign 603 has been selected by the user, the control unit 401 starts the processing according to the flowcharts shown in FIGS. 5A and 5B.

First, in step S501, the control unit 401 loads a USB 2.0 driver to be used in the USB connection between the connection unit 415 of the digital camera 400 and the connection unit 453 of the external radio module 450, and drives the connection unit 415 using the driver. In step S502, the control unit 401 turns on the power supply of the external radio module 450. In step S503, the control unit 401 activates the wireless LAN by controlling the external wireless communication unit 452. Next, in step S504, the control unit 401 performs wireless network retrieval processing in which wireless access point information is acquired from a beacon that is transmitted from each wireless access point that is present in the surrounding area by controlling the external wireless communication unit 452.

Figure 8C:
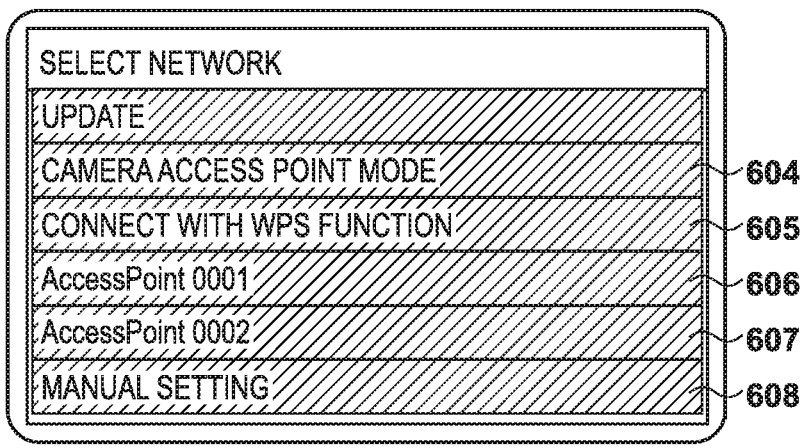

Next, in step S505, the control unit 401 displays the list of wireless access point information that has been retrieved in the wireless network retrieval processing in step S504 in the display unit 406. FIG. 8C shows an example of the list of wireless access point information displayed in step S505. Reference signs 606 and 607 in the diagram indicate wireless access points retrieved in the wireless network retrieval processing in step S504. A reference sign 604 indicates a message "camera access point mode" indicating that the digital camera 400 functions as an access point. A reference sign 605 indicates a message "connect by WPS function" indicating that connection is performed using a WPS (registered trademark: Wi-Fi Protected Setup). Also, a reference sign 608 indicates a message "manual setting" indicating that the user manually sets the parameters. The user can select one of the reference signs 604 to 608.

Next, in step S506, the control unit 401 determines whether or not the "camera access point mode" indicated by the reference sign 604 in the list screen in FIG. 8C displayed in the display unit 406 has been selected by the user, based on a signal from the operation unit 405. In step S506, the control unit 401, upon determining that the "camera access point mode" has been selected by the user, advances the processing to step S507, and upon determining that the "camera access point mode" has not been selected by the user, advances the processing to step S513.

Here, the case where the "camera access point mode" has been selected by the user will be described. In this case, in step S507, the control unit 401 determines whether the user has selected to manually set the channel of the camera access point. In step S507, the control unit 401, upon determining that the user has selected to manually set the channel, advances the processing to step S508, and upon determining that the user has not selected to manually set the channel, that is, the user has selected automatic setting, advances the processing to step S509.

In step S508, the control unit 401 stores the channel of the camera access point selected by the user in the working memory 404. Also, in step S509, the control unit 401 randomly determines the channel of the camera access point, and stores the determined channel in the working memory 404.

In step S510, the control unit 401 determines whether the channel of the camera access point stored in the working memory 404 in step S508 or step S509 is a channel using the 5 GHz band. In step S510, the control unit 401, upon determining that the channel uses the 5 GHz band, advances the processing to step S511, and upon determining that the channel does not use the 5 GHz band, that is, uses the 2.4 GHz band, advances the processing to step S512.

In step S511, the control unit 401 switches the USB driver used for the USB connection between the connection unit 415 of the digital camera 400 and the connection unit 453 of the external radio module 450 from the USB 2.0 to the USB 3.0, and advances the processing to step S512. Here, the processing for switching the USB driver from the USB 2.0 to the USB 3.0 in step S511 will be described in detail with reference to FIG. 6.

Figure 6:
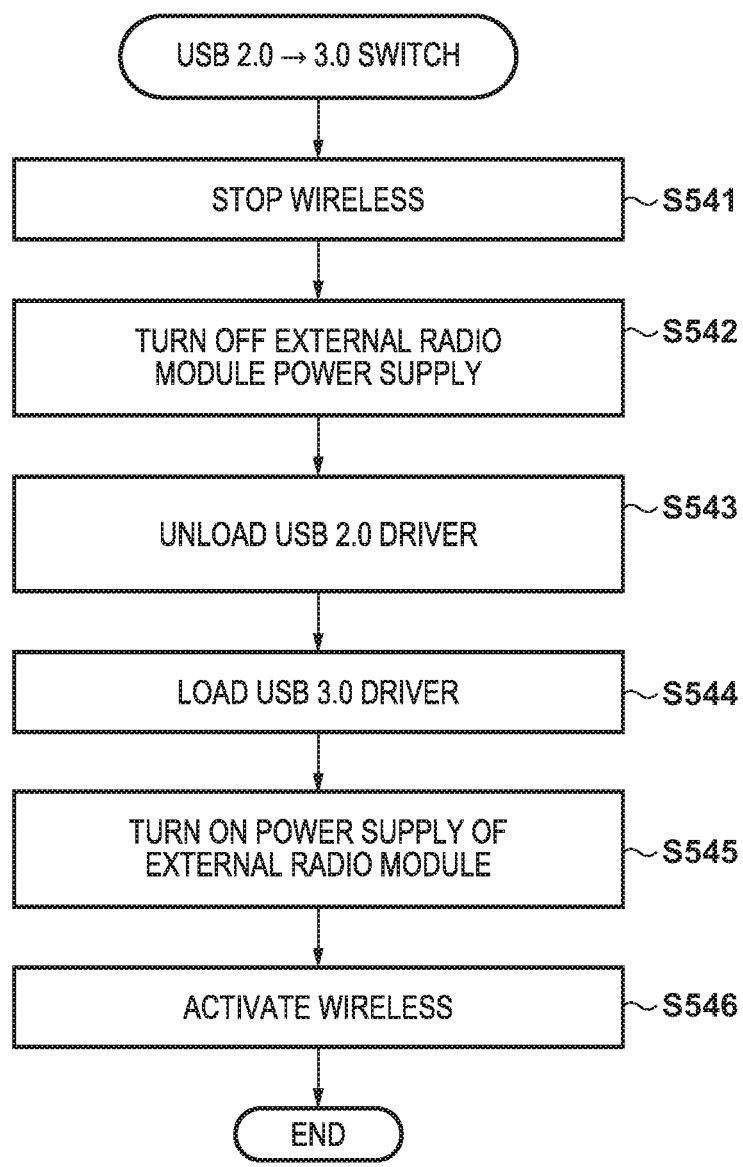
FIG. 6 is a flowchart illustrating processing for switching a USB driver from USB 2.0 to USB 3.0 in the digital camera of the second embodiment.

FIG. 6 is a flowchart of the processing for switching the USB driver used for the USB connection between the connection unit 415 of the digital camera 400 and the connection unit 453 of the external radio module 450 from the USB 2.0 to the USB 3.0. Each process in the flowchart is realized by the control unit 401 extracting a program stored in the non-volatile memory 403 to the working memory 404 and executing the program.

First, in step S541, the control unit 401 stops the wireless LAN by controlling the external wireless communication unit 452. Next, in step S542, the control unit 401 turns off the power supply of the external radio module 450. Next, in step S543, the control unit 401 unloads the USB 2.0 driver used in the USB connection between the connection unit 415 of the digital camera 400 and the connection unit 453 of the external radio module 450. Next, in step S544, the control unit 401 loads the USB 3.0 driver to be used in the USB connection between the connection unit 415 of the digital camera 400 and the connection unit 453 of the external radio module 450, and advances the processing to step S545. Next, in step S545, the control unit 401 turns on the power supply of the external radio module 450. Also, in step S546, the control unit 401 activates the wireless LAN by controlling the external wireless communication unit 452. Then, the processing for switching the USB driver used in the USB connection between the connection unit 415 of the digital camera 400 and the connection unit 453 of the external radio module 450 from the USB 2.0 to the USB 3.0 is ended.

As a result of the processing described above, the USB driver used in the USB connection between the connection unit 415 of the digital camera 400 and the connection unit 453 of the external radio module 450 can be switched from the USB 2.0 to the USB 3.0.

Figure 5B:
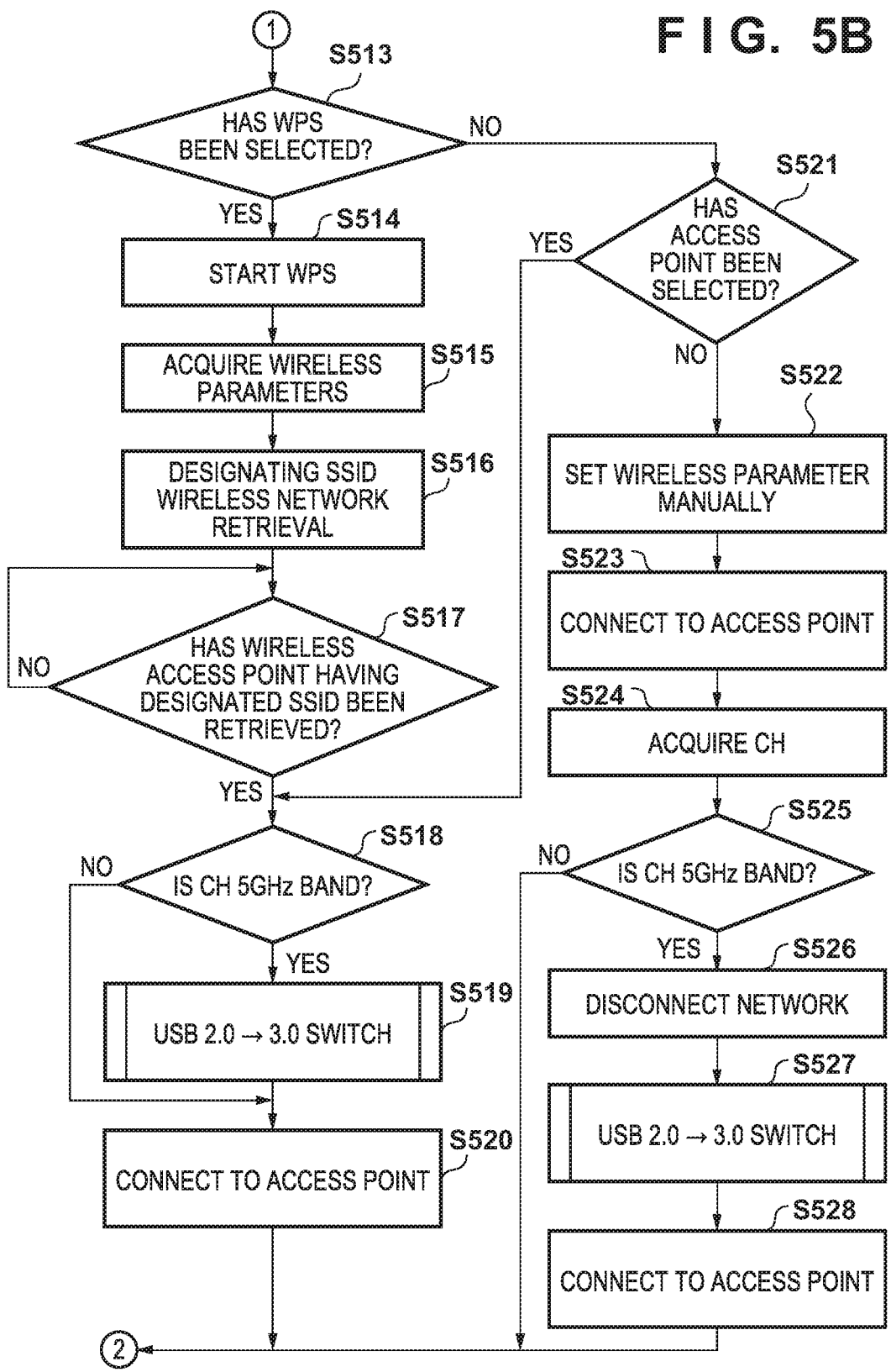
Figure 8D:
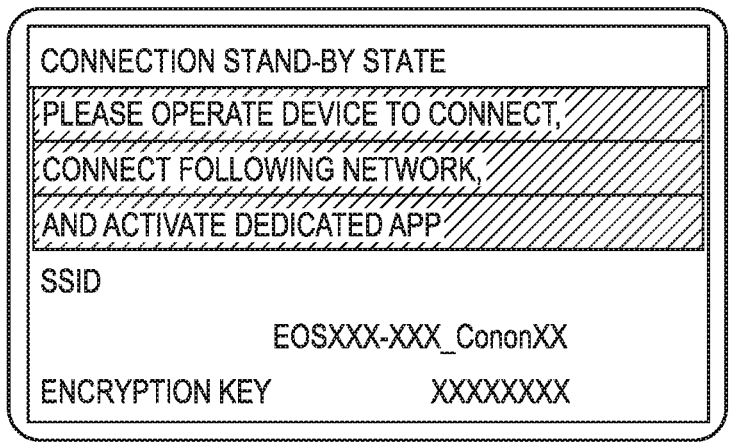

The description returns to the processing in FIGS. 5A and 5B. In step S512, the control unit 401 activates the camera access point by controlling the external wireless communication unit 452, and ends this processing. In the present embodiment, the SSID and encryption key of the camera access point are randomly generated. When the camera access point is activated, the control unit 401 displays the SSID and encryption key of the camera access point in the display unit 406. FIG. 8D is an exemplary display of the SSID and encryption key of the camera access point to be displayed in the display unit 406.

Next, the processing when the control unit 401 determines, in step S506, that the user has not selected the "camera access point mode" will be described. In this case, in step S513, the control unit 401 determines whether the user has selected the "connect by WPS function" in the screen shown in FIG. 8C based on a signal from the operation unit 405. In step S513, the control unit 401, upon determining that the user has selected the "connect by WPS function", advances the processing to step S514, and upon determining that the user has not selected the "connect by WPS function", advances the processing to step S521.

Figure 8E:
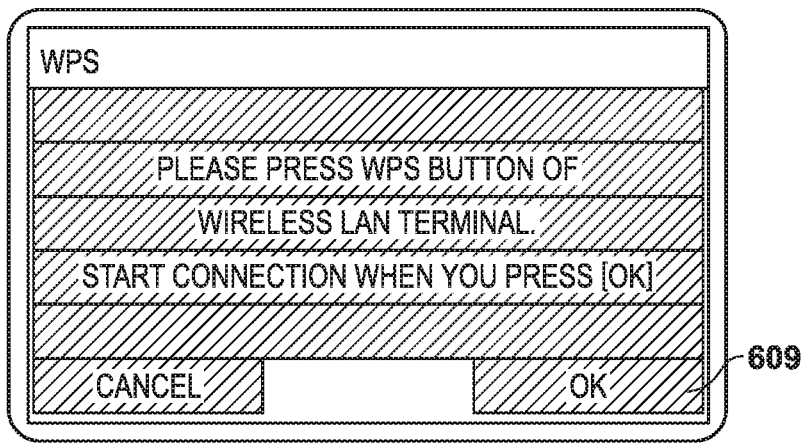
Figure 8F:
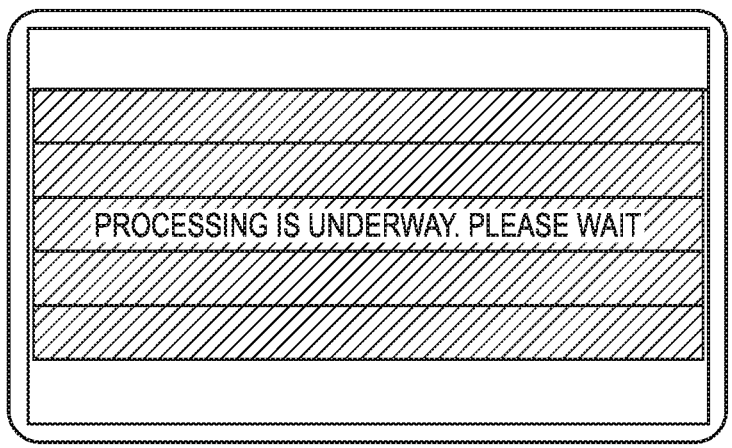

Here, the case where the user has selected the "connect by WPS function" will be described. In this case, in step S514, the control unit 401 starts the WPS processing by controlling the external wireless communication unit 452, and advances the processing to step S515. When the user has selected the "connect by WPS function" indicated by the reference sign 605, in FIG. 8C, the control unit 401 displays a screen displaying a message indicating that the WPS will be started, as shown in FIG. 8E. Also, when the user has selected an OK button indicated by a reference sign 609 in this screen, the control unit 401 starts the WPS processing shown in step S514, and displays a screen indicating that the processing is underway, which is shown in FIG. 8F, in the display unit 406. Also, when the user has pressed a WPS button of the corresponding wireless access point, the control unit 401 starts processing for exchanging wireless parameters through the WPS between the digital camera 400 and the corresponding wireless access point.

Next, in step S515, the control unit 401, upon acquiring the wireless parameters from the corresponding wireless access point through the wireless parameter exchange processing in the WPS, advances the processing to step S516. Note that the wireless parameters that can be acquired through the WPS include an SSID, a password, an authentication type, an encryption method, and the like.

In step S516, the control unit 401 performs wireless network retrieval processing while designating the SSID of the wireless parameters acquired in step S515, by controlling the external wireless communication unit 452. The wireless network retrieval processing while designating the SSID is also processing for determining whether or not a wireless access point having the designated SSID is present in the surrounding area.

Next, in step S517, the control unit 401 determines whether or not the wireless access point having the designated SSID has been retrieved through the wireless network retrieval processing while designating the SSID in step S516. In step S517, the control unit 401, upon determining that the wireless access point having the designated SSID has been retrieved, advances the processing to step S518, and upon determining that the wireless access point having the designated SSID has not been retrieved, returns the processing to step S517. Note that the control unit 401 may, upon determining that the wireless access point having the designated SSID has not been retrieved in a preset period, perform error processing.

Next, in step S518, the control unit 401 determines whether or not the channel of the wireless access point retrieved through the wireless network retrieval processing while designating the SSID in step S516 is a 5 GHz band channel. The channel of the wireless access point can be acquired through the wireless network retrieval processing while designating the SSID in step S516. In step S518, the control unit 501, upon determining that the channel of the wireless access point is the 5 GHz band channel, advances the processing to step S519, and upon determining that the channel is not the 5 GHz band channel, that is, the channel is a 2.4 GHz band channel, advances the processing to step S520.

Next, in step S519, the control unit 401 switches the USB driver to be used for the USB connection between the connection unit 415 of the digital camera 400 and the connection unit 453 of the external radio module 450 from the USB 2.0 to the USB 3.0, and advances the processing to step S520. The processing for switching the USB driver from the USB 2.0 to the USB 3.0 is the same as the processing in step S511 described above, and therefore the description thereof is omitted.

Next, in step S520, the control unit 401 performs processing for connecting to the wireless access point according to the wireless parameters acquired through the WPS processing in step S515 by controlling the external wireless communication unit 452, and ends this processing.

The processing flow for connecting to the wireless access point using the WPS function has been described above.

Next, the case where the user has not selected the "connect by WPS function" in step S513 will be described.

In step S521, the control unit 401 determines whether or not the user has selected a "wireless access point name" retrieved through the wireless network retrieval processing in step S504 by operating the operation unit 405 on the screen shown in FIG. 8C that is displayed in the display unit 406. For example, the control unit 401 determines whether or not the user has selected "AccessPoint_0001" indicated by a reference sign 606 or "AccessPoint_0002" indicated by a reference sign 607 in FIG. 8C. In step S520, the control unit 401, upon determining that the user has selected a wireless access point name, advances the processing to step S518, and upon determining that the user has selected no wireless access point name, advances the processing to step S522.

Figure 8G:
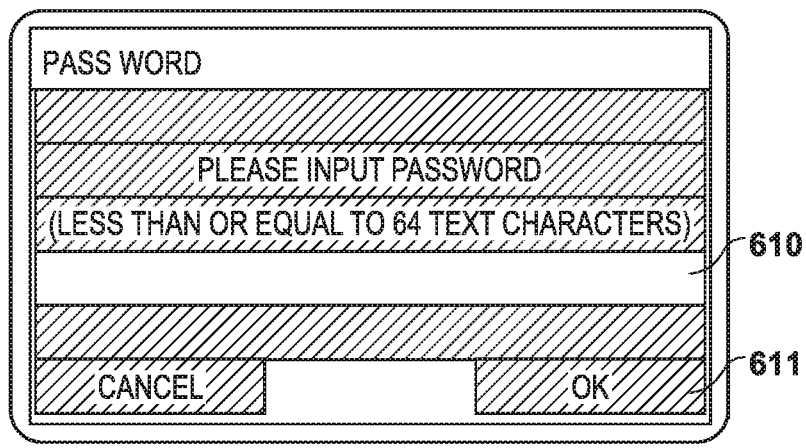
Figure 8H:
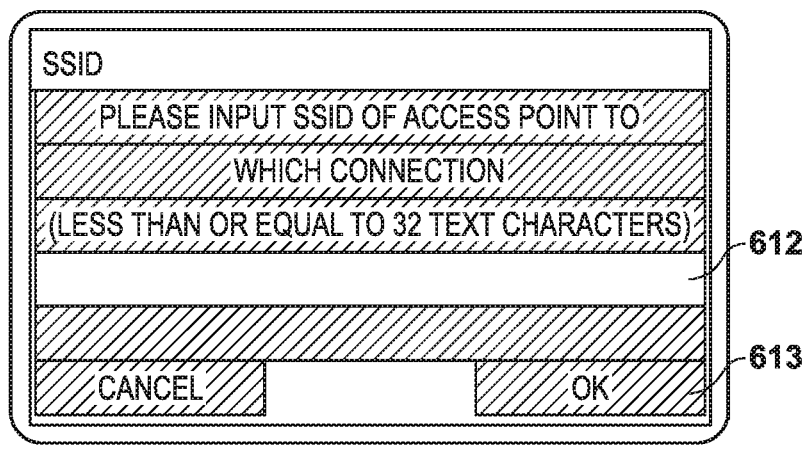
Figure 8I:
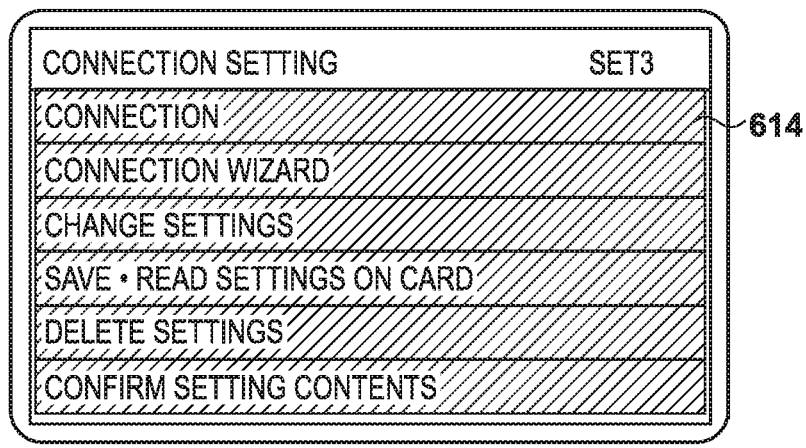

Here, the case where the user has selected a wireless access point name will be described. When the user has selected one of the wireless access point names in FIG. 8C, if the selected access point is password protected, the control unit 401 displays a password input screen as shown in FIG. 8G in the display unit 406, and prompts the user to input the password. When the user pressed an OK button indicated by the reference sign 611 after inputting the password, the control unit 401 displays the screen indicating that the processing is underway, which is shown in FIG. 8F, in the display unit 406. Also, the control unit 401 performs processing in step S518 onward. Also, when the wireless access point is not password protected, the control unit 401, upon a wireless access point having been selected by the user, displays the screen indicating that the processing is underway, which is shown in FIG. 8F, in the display unit 406, and performs processing in step S518 onward.

In step S518, the control unit 401 determines whether or not the channel of the wireless access point selected by the user is a 5 GHz band channel. The channel of the wireless access point can be acquired through the wireless network retrieval processing in step S504. In step S518, the control unit 401, upon determining that the channel of the wireless access point is the 5 GHz band channel, advances the processing to step S519, and upon determining that the channel is not the 5 GHz band channel, that is, the channel is the 2.4 GHz band channel, advances the processing to step S520.

Next, in step S519, the control unit 401 switches the USB driver to be used for the USB connection between the connection unit 415 of the digital camera 400 and the connection unit 453 of the external radio module 450 from the USB 2.0 to the USB 3.0, and advances the processing to step S520. The processing for switching the USB driver from the USB 2.0 to the USB 3.0 is the same as the processing in step S511, and therefore the description thereof is omitted.

Next, in step S520, the control unit 401 performs processing for connecting to the wireless access point by controlling the external wireless communication unit 452, and ends this processing. The processing for connecting to the wireless access point is performed using the wireless parameters acquired in the wireless network retrieval processing in step S504 and the password input by the user on the screen shown in FIG. 8G. The processing flow for connecting to the selected wireless access point has been described above.

Next, a case will be described where the user has not selected a wireless access point name in step S521, that is, the user has selected "manual setting" indicated by the reference sign 608 on the screen shown in FIG. 8C using the operation unit 405.

In step S522, the control unit 401 stores the wireless parameters manually set by the user in the working memory 404. When the user has selected the manual setting indicated by the reference sign 608 on the screen shown in FIG. 8C, the control unit 401 displays an SSID input screen shown in FIG. 8H in the display unit 406. When the user has input an SSID in a field indicated by a reference sign 612 in FIG. 8H, and has pressed the OK button indicated by a reference sign 613, the control unit 401 thereafter displays a security setting screen or the password input screen shown in FIG. 8G in the display unit 406, and prompts the user to set the wireless parameters for the wireless access point to which the user desires to connect.

Next, in step S523, the control unit 401 performs processing for connecting to the wireless access point based on the wireless parameters that have been set by the user in step S522, and have been stored in the working memory 404, by controlling the external wireless communication unit 452. Also, in step S524, the control unit 401 acquires the channel of the wireless access point connected in step S523 by controlling the external wireless communication unit 452, and advances the processing to step S525.

In step S525, the control unit 401 determines whether or not the channel of the wireless access point acquired in step S524 is the 5 GHz band channel. In step S525, the control unit 401, upon determining that the channel of the wireless access point is the 5 GHz band channel, advances the processing to step S526, and upon determining that the channel is not the 5 GHz band channel, that is, the channel is the 2.4 GHz band channel, ends this processing.

In step S526, the control unit 401 performs disconnection from the wireless access point connected in step S523 by controlling the external wireless communication unit 452. Also, in step S527, the control unit 401 switches the USB driver to be used for the USB connection between the connection unit 415 of the digital camera 400 and the connection unit 453 of the external radio module 450 from the USB 2.0 to the USB 3.0, and advances the processing to step S528. The processing for switching the USB driver from the USB 2.0 to the USB 3.0 is the same as the processing in steps S511 and S519, and therefore the description thereof is omitted.

Next, in step S528, the control unit 401 performs processing for connecting to the wireless access point based on the wireless parameters that have been set by the user in step S522, and have been stored in the working memory 404, by controlling the external wireless communication unit 452, and ends this processing.

The processing flow when connecting to a wireless access point through manual setting has been described above.

After the processing of the flowcharts in FIGS. 5A and 5B has been completed, that is, after the activation of the camera access point and the connection to the wireless access point have been completed, the control unit 401 performs processing for connecting to a connection partner device by performing IP addressing. Also, the control unit 401, upon completing the connection to the connection partner device, stores the combination of the communication setting including wireless parameters and IP addressing information and the function setting including connection partner device information such as a UUID in the non-volatile memory 403 as SET so as to be used in the next connection and onward. When the information is stored as the SET, the stored pieces of SET information are displayed, as indicated by the reference sign 602 in FIG. 8A. The reference sign 602 indicates a case where the FTP (File Transfer Protocol) transfer has been stored as the function setting.

The processing flow when performing the wireless LAN connection from the connection wizard using the external radio module 450, in the digital camera 400, has been described above.

Note that, in the present embodiment, a configuration has been adopted in which an upper-level application acquires the wireless parameters of a wireless access point through the WPS processing (step S515 in FIG. 5B), and the connection is made to the wireless access point using the acquired wireless parameters, but the configuration may be such that, when the WPS processing is performed, connection to the wireless access point is automatically made by a lower-level wireless driver at the same time of the upper-level application having acquired the wireless parameters, and the wireless driver, upon completing the connection to the wireless access point, makes a connection completion notification to the upper-level application. When such a configuration is adopted, the upper-level application, after receiving the connection completion notification of connection to the wireless access point, acquires the channel of the connected wireless access point, and performs, if the channel is the 5 GHz band channel, processing for switching the USB driver from the USB 2.0 to the USB 3.0. This processing is the same as the processing in steps S524 to S528 of the flowchart in FIG. 5B.

Processing in Connection in Accordance with SET Information

Next, the processing, in the digital camera 400, when the wireless LAN connection is performed in accordance with the SET information stored in the non-volatile memory 403 using the external radio module 450 will be described with reference to FIGS. 7A, 7B, and 8A to 8I.

FIGS. 7A and 7B are flowcharts of the processing when the wireless LAN connection is performed in accordance with the SET information stored in the non-volatile memory 403 using the external radio module 450, in the digital camera 400 in the present embodiment. Each processing in the flowchart is realized by the control unit 401 extracting a program stored in the non-volatile memory 403 to the working memory 404 and executing the program. Upon the user having selected stored SET3 indicated by the reference sign 602 from the SET list shown in FIG. 8A, the control unit 401 displays a screen shown in FIG. 8I in the display unit 406. Then, when "connection" indicated by a reference sign 614 in the diagram has been selected by the user, the control unit 401 starts the processing of the flowchart in FIGS. 7A and 7B in accordance with the SET3 information.

In step S551, the control unit 401 acquires channel information by referring to the SET communication setting information stored in the non-volatile memory 403, and advances the processing to step S552.

In step S552, the control unit 401 determines whether or not the channel in the communication setting acquired in step S551 is the 2.4 GHz band channel. In step S552, the control unit 401, upon determining that the channel is the 2.4 GHz band channel, advances the processing to step S553, and upon determining that the channel is not the 2.4 GHz band channel, advances the processing to step S559.

Here, the case where the acquired channel is the 2.4 GHz band channel will be described. In step S553, the control unit 401 loads the USB 2.0 driver as the USB driver to be used for the USB connection between the connection unit 415 of the digital camera 400 and the connection unit 453 of the external radio module 450. Next, in step S554, the control unit 401 turns on the power supply of the external radio module 450. Also, in step S555, the control unit 401 activates the wireless LAN by controlling the external wireless communication unit 452, and advances the processing to step S556.

In step S556, the control unit 401 determines whether or not the communication setting is set to the camera access point mode by referring to the SET communication setting information stored in the non-volatile memory 403. In step S556, the control unit 401, upon determining that the communication setting is set to the camera access point mode, advances the processing to step S557, and upon determining that the communication setting is not set to the camera access point mode, that is, the communication setting is set to the infrastructure mode, advances the processing to step S558.

In step S557, the control unit 401 activates the camera access point in accordance with the SET communication setting stored in the non-volatile memory 403, by controlling the external wireless communication unit 452, and ends this processing.

On the other hand, in step S558, the control unit 401 performs connection to the wireless access point in accordance with the SET communication setting stored in the non-volatile memory 403, by controlling the external wireless communication unit 452, and ends this processing.

The processing when the channel in the stored communication setting is the 2.4 GHz band channel has been described above.

Next, a case where, in step S552, the control unit 401 determined that the acquired channel is not the 2.4 GHz band channel, and has advanced the processing to step S559 will be described.

In step S559, the control unit 401 determines whether or not the channel acquired in step S551 is the 5 GHz band channel. In step S559, the control unit 401, upon determining that the channel is the 5 GHz band channel, advances the processing to step S560, and upon determining that the channel is not the 5 GHz band channel, advances the processing to step S563.

Here, the case where the channel is the 5 GHz band channel will be described. In step S560, the control unit 401 loads the USB 3.0 driver as the USB driver to be used for the USB connection between the connection unit 415 of the digital camera 400 and the connection unit 453 of the external radio module 450. Next, in step S561, the control unit 401 turns on the power supply of the external radio module 450. Next, in step S562, the control unit 401 activates the wireless LAN by controlling the external wireless communication unit 452, and advances the processing to step S556.

In step S556, the control unit 401 determines whether or not the communication setting is set to the camera access point mode by referring to the SET communication setting information stored in the non-volatile memory 403. In step S556, the control unit 401, upon determining that the communication setting is set to the camera access point mode, advances the processing to step S557, and upon determining that the communication setting is not set to the camera access point mode, that is, the communication setting is set to the infrastructure mode, advances the processing to step S558.

Next, in step S557, the control unit 401 activates the camera access point in accordance with the SET communication setting stored in the non-volatile memory 403, by controlling the external wireless communication unit 452, and ends this processing.

On the other hand, in step S558, the control unit 401 performs connection to the wireless access point in accordance with the SET communication setting stored in the non-volatile memory 403, by controlling the external wireless communication unit 452, and ends this processing.

The processing when the channel in the stored communication setting is the 5 GHz band channel has been described above.

Next, the case where, in step S559, the control unit 401 has determined that the channel is not the 5 GHz band channel will be described. The case where the channel is neither the 2.4 GHz band channel nor the 5 GHz band channel indicates a case where the channel is not stored in the SET communication setting information stored in the non-volatile memory 403. In the connection wizard in the present embodiment, the aforementioned communication setting and function setting are set while performing connection, and after the connection has been completed, the combination of the communication setting and the function setting is stored in the non-volatile memory 403 as the SET. It is also possible that, separately from this, the user can manually set all of the communication settings and function settings and stores them in the non-volatile memory 403. Therefore, when the user saves the setting of the wireless access point that has been manually set as the communication setting, for example, because the channel information of the wireless access point is not input in the manual setting, the channel information is unknown until the connection to the wireless access point has been actually performed. The processing described in the following is processing to be performed when the channel information is not stored because the user has manually set the communication setting in this way.

In step S563, the control unit 401 loads the USB 2.0 driver as the USB driver to be used for the USB connection between the connection unit 415 of the digital camera 400 and the connection unit 453 of the external radio module 450. In step S564, the control unit 401 turns on the power supply of the external radio module 450. In step S565, the control unit 401 activates the wireless LAN by controlling the external wireless communication unit 452. In step S566, the control unit 401 performs connection to the wireless access point in accordance with the SET communication setting stored in the non-volatile memory 403 by controlling the external wireless communication unit 452. In step S567, the control unit 401 acquires the channel of the wireless access point connected in step S566 by controlling the external wireless communication unit 452. Also, in step S568, the control unit 401 stores the channel information of the wireless access point acquired in step S567 in the communication setting of the non-volatile memory 403, and advances the processing to step S569.

In step S569, the control unit 401 determines whether or not the channel in the communication setting acquired in step S567 is the 5 GHz band channel. In step S569, the control unit 401, upon determining that the channel is the 5 GHz band channel, advances the processing to step S570, and upon determining that the channel is not the 5 GHz band channel, that is, the channel is 2.4 GHz band channel, ends this processing.

Next, in step S570, the control unit 401 performs disconnection from the wireless access point connected in step S566 by controlling the external wireless communication unit 452. Also, in step S571, the control unit 401 switches the USB driver to be used for the USB connection between the connection unit 415 of the digital camera 400 and the connection unit 453 of the external radio module 450 from the USB 2.0 to the USB 3.0, and advances the processing to step S572. The processing for switching the USB driver from the USB 2.0 to the USB 3.0 is the same as the processing in steps S511, S519, and S527 in FIGS. 5A and 5B, and therefore the description thereof is omitted.

Next, in step S572, the control unit 401 again performs processing for connecting to the wireless access point in accordance with the SET communication setting stored in the non-volatile memory 403 by controlling the external wireless communication unit 452, and ends the processing.

The processing flow when the channel information is not stored in the stored communication setting has been described above.

The control unit 401, after completing the processing of the flowchart in FIGS. 7A and 7B, that is, after completing activation of the camera access point and connection to the wireless access point in accordance with the SET communication setting stored in the non-volatile memory 403, performs IP addressing in accordance with the SET communication setting stored in the non-volatile memory 403, and performs processing for connecting to the connection partner device in accordance with the SET function setting stored in the non-volatile memory 403.

The processing flow when, in the digital camera 400, the wireless LAN connection is performed in accordance with the SET information stored in the non-volatile memory 403 using the external radio module 450 has been described above.

In the present embodiment, it is assumed that a plurality of communication settings can be stored as the SET communication setting to be stored in the non-volatile memory 403. For example, when two communication settings ("communication setting 1" and "communication setting 2") are stored in the SET, the operations are such that if connection is first performed in accordance with the "communication setting 1" and failed, connection is attempted in accordance with the "communication setting 2". Here, the processing flow when two communication settings ("communication setting 1" and "communication setting 2") are stored in the SET will be described.

Following Patterns will be Described.

Pattern I: "communication setting 1"; 2.4 GHz band, "communication setting 2"; 2.4 GHz band, Pattern II: "communication setting 1"; 5 GHz band, "communication setting 2"; 2.4 GHz band, Pattern III: "communication setting 1"; channel not stored, "communication setting 2": 2.4 GHz band, Pattern IV: "communication setting 1": 2.4 GHz band, "communication setting 2"; channel not stored.

Case of Pattern I

Since the channel of the communication setting 1 is the 2.4 GHz band channel, the control unit 401 activates the wireless LAN using the USB 2.0 driver, and attempts to perform connection in accordance with the "communication setting 1". If the control unit 401 fails to connect, the control unit 401 attempts to perform connection in accordance with the "communication setting 2" without switching the USB driver because the channel of the communication setting 2 is also the 2.4 GHz band channel.

Case of Pattern II

Since the channel of the communication setting 1 is the 5 GHz band channel, the control unit 401 activates the wireless LAN using the USB 3.0 driver, and attempts to perform connection in accordance with the "communication setting 1". If the control unit 401 fails to connect, the control unit 401 attempts to perform connection in accordance with the "communication setting 2" after switching the USB driver from the USB 3.0 to the USB 2.0 because the channel of the communication setting 2 is the 2.4 GHz band channel.

Case of Pattern III

Since the channel of the communication setting 1 is not stored, the control unit 401 activates the wireless LAN using the USB 2.0 driver, and attempts to perform connection in accordance with the "communication setting 1". If the control unit 401 fails to connect, the control unit 401 attempts to perform connection in accordance with the "communication setting 2" without switching the USB driver because the channel of the communication setting 2 is also the 2.4 GHz band channel. If the channel of the "communication setting 2" is the 5 GHz band channel, after failed in connection in accordance with the "communication setting 1", the control unit 401 switches the USB driver to the USB 3.0 before attempting to perform connection in accordance with the "communication setting 2".

Case of Pattern IV

Since the channel of the communication setting 1 is the 2.4 GHz band channel, the control unit 401 activates the wireless LAN using the USB 2.0 driver, and attempts to perform connection in accordance with the "communication setting 1". If the control unit 401 fails to connect, the control unit 401 attempts to perform connection in accordance with the "communication setting 2" without switching the USB driver because the setting of the communication setting 2 is the "channel not stored". If the connection is made with the "communication setting 2", the control unit 401 acquires the channel, and if the channel is the 5 GHz band channel, performs disconnection once, and again attempts to perform connection after switching the USB driver from the USB 2.0 to the USB 3.0. If the channel is the 2.4 GHz band channel, the control unit 401 does not switch the USB driver.

The processing flow when two communication settings are stored in the SET has been described.

As described above, according to the present embodiment, when the wireless LAN connection is performed using the connection wizard, first, the wireless LAN is activated using the USB 2.0 driver, and upon becoming clear that the channel of the camera access point to be activated and the channel of the wireless access point to which connection is performed are the 5 GHz band channel, the USB driver is switched to the USB 3.0, and as a result, the interference between the USB and the wireless LAN can be reduced. Also, in the case of the 5 GHz band channel, the USB driver is switched to the USB 3.0, and as a result, the bottleneck in communication speed due to the use of the USB 2.0 can be resolved, and high-speed wireless LAN communication can be performed.

Note that, in the present embodiment, a configuration has been adopted in which when the wireless LAN connection is performed using the connection wizard, first, the wireless LAN is activated using the USB 2.0 driver, and upon becoming clear that the channel of the camera access point to be activated and the channel of the wireless access point to which connection is performed are the 5 GHz band channel, the USB driver is switched to the USB 3.0. However, the configuration may be such that, first, the wireless LAN is activated using the USB 3.0 driver, and upon becoming clear that the channel of the camera access point to be activated and the channel of the wireless access point to which connection is performed are the 2.4 GHz band channel, the USB driver is switched to the USB 2.0. The configuration in which the USB 2.0 driver is used first, and upon becoming clear that the channel is the 5 GHz band channel, the USB driver is switched to the USB 3.0 has merits such that because, in the present embodiment, first, wireless network retrieval is performed, and if interference occurs when the USB 3.0 is used, the coverage of the radio wave may be limited, there are cases where a larger number of wireless networks can be found in the wireless network retrieval if the USB 2.0 is used. Also, it is considered that because, at the present time, the 2.4 GHz band is more widely used, the possibility that the connection can be made without switching the USB driver is high. On the other hand, this configuration has demerits such that because the USB communication speed is slow in the USB 2.0 relative to the USB 3.0, the USB communication with the external radio module takes time relative to the USB 3.0. Also, the configuration in which the USB 3.0 driver is used first, and upon becoming clear that the channel is the 2.4 GHz band channel, the USB driver is switched to the USB 2.0 driver has merits such that because the USB communication speed in the USB 3.0 is fast relative to the USB 2.0, the speed in the USB communication with the external radio module is high. On the other hand, this configuration has demerits such that it is possible that, if connection in the 2.4 GHz band is attempted using the USB 3.0, the connection is failed due to the interference. It is possible to determine which of the USB drivers is first used in the design concept.

Also, in the present embodiment, a configuration has been adopted in which first, the wireless LAN is activated using the USB 2.0 driver, and upon becoming clear that the channel of the camera access point to be activated and the channel of the wireless access point to which connection is performed are the 5 GHz band channel, the USB driver is switched to the USB 3.0. But the configuration may be such that, in the case of the 5 GHz band as well, the USB 2.0 is used without switching to the USB 3.0. The communication speed in the USB 2.0 is low relative to the USB 3.0, and therefore the communication speed in the wireless LAN is influenced, but if the use case does not care the communication speed, the USB 2.0 may be used without switching to the USB 3.0. As a result of adopting such a configuration, switching from the USB 2.0 to the USB 3.0 need not be performed, and the USB driver need not be switched, and as a result, the processing can be simplified and the time required to complete the connection can be reduced.

Also, in the present embodiment, a configuration has been adopted in which, first, the wireless LAN is activated using the USB 2.0 driver, and upon becoming clear that the channel of the camera access point to be activated and the channel of the wireless access point to which connection is performed are the 5 GHz band channel, the USB driver is switched to the USB 3.0. But the configuration may be such that which of the USB 2.0 and USB 3.0 is used is determined first, and thereafter, when connection is performed by activating the wireless LAN, if the USB 3.0 is used, only the 5 GHz band can be used, and if the USB 2.0 is used, both of the 2.4 GHz band and the 5 GHz band can be used, or only the 2.4 GHz can be used considering the communication speed. As a result of adopting such a configuration, the USB driver need not be switched, and as a result, the processing can be simplified and the time required to complete the connection can be reduced.

Also, according to the present embodiment, when connection is performed using the stored SET, based on the channel information stored in the SET communication setting, if the channel is the 5 GHz band channel, the USB 3.0 driver is used, and if the channel is the 2.4 GHz band channel, the USB 2.0 driver is used, and as a result, the interference between the USB and the wireless LAN can be reduced. Also, if the channel information is not stored in the SET communication setting, the channel information is acquired after, first, connection is performed using the USB 2.0 driver, and if the channel is the 5 GHz band channel, the USB driver is switched to the USB 3.0 driver, and as a result, the interference between the USB and the wireless LAN can be reduced. Also, if the channel is the 5 GHz band channel, the USB driver is switched to the USB 3.0 driver, and as a result, the bottleneck in communication speed due to the use of the USB 2.0 can be resolved.

Note that, in the present embodiment, a configuration has been adopted in which, if the channel information is not stored in the SET communication setting, the channel information is acquired after, first, connection is performed using the USB 2.0 driver, and if the channel is the 5 GHz band channel, the USB driver is switched to the USB 3.0 driver. But the configuration may be such that the channel information is acquired after, first, connection is performed using the USB 3.0 driver, and if the channel is the 2.4 GHz band channel, the USB driver is switched to the USB 2.0 driver.

Also, when a plurality of settings are stored in the stored SET communication setting as well, as a result of setting the USB driver according to the channel stored in each communication setting, the interference between the USB and the wireless LAN can be reduced.

As described above, according to the present embodiment, in the case where the USB communication with an external apparatus and the wireless LAN communication are used at the same time, when the wireless LAN communication is started in a state in which USB connection is already made with the external apparatus, if the USB communication is with the USB 3.0 and the wireless LAN communication is in the 2.4 GHz band, the USB communication type is switched from the USB 3.0 to the USB 2.0, and as a result, the interference between the USB and the wireless LAN can be reduced. Also, when the USB connection is started in a state in which the wireless LAN communication is underway, the USB 2.0 is used if the wireless LAN communication is in the 2.4 GHz band, and the USB 3.0 is used if the wireless LAN communication is in the 5 GHz band, and as a result, the interference between the USB and the wireless LAN can be reduced.

Also, when an external radio module can be connected to a digital camera, and the USB is used as the interface between the digital camera and the external radio module, if the wireless LAN connection is performed using the connection wizard, first, the wireless LAN is activated using the USB 2.0 driver, and upon becoming clear that the channel of the camera access point to be activated and the channel of the wireless access point to which connection is performed are the 5 GHz band channel, the USB driver is switched to the USB 3.0. With this, the interference between the USB and the wireless LAN can be reduced. Also, in the case of the 5 GHz band channel, the USB driver is switched to the USB 3.0, and as a result, the bottleneck in communication speed due to the use of the USB 2.0 can be resolved, and high-speed wireless LAN communication can be performed. Also, when connection is performed using the stored SET, based on the channel information stored in the SET communication setting, if the channel is the 5 GHz band channel, the USB 3.0 driver is used, and if the channel is the 2.4 GHz band channel, the USB 2.0 driver is used, and as a result, the interference between the USB and the wireless LAN can be reduced. Also, if the channel information is not stored in the SET communication setting, the channel information is acquired after, first, connection is performed using the USB 2.0 driver, and if the channel is the 5 GHz band channel, the USB driver is switched to the USB 3.0 driver, and as a result, the interference between the USB and the wireless LAN can be reduced. Also, if the channel is the 5 GHz band channel, the USB driver is switched to the USB 3.0 driver, and as a result, the bottleneck in communication speed due to the use of the USB 2.0 can be resolved.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-003612, filed Jan. 11, 2019, which is hereby incorporated by reference herein in its entirety.

What is claimed is:

1. A communication apparatus comprising:
a USB (Universal Serial Bus) interface configured to conform to a first USB standard and a second USB standard; and
a processor,
wherein the processor (a) drives the USB interface according to the second USB standard, (b) turns on an external radio module connected with the USB interface after driving the USB interface according to the second USB standard, (c) acquires, from the external radio module, information related to a network to be connected with after turning on the external radio module, and (d) determines whether the network uses a 2.4 GHz band based on the acquired information related to the network,
wherein, if it is determined that the network does not use the 2.4 GHz band, the processor (e) turns off the external radio module, (f) drives the USB interface according to the first USB standard after turning off the external radio module, and (g) turns on the external radio module after driving the USB interface according to the first USB standard, and
wherein the first USB standard is operated at 2.5 GHz and the second USB standard is operated at 240 MHz.

2. The communication apparatus according to claim 1, wherein
the first USB standard includes USB 3.0 and the second USB standard includes USB 2.0.

3. The communication apparatus according to claim 1, further comprising:
a display unit configured to display a menu through which a user can select whether the external radio module is to be activated in an access point mode or to be activated in a client mode in an infrastructure mode,
wherein the processor performs driving control on the external radio module in a selected mode instructed by a user through the displayed menu.

4. The communication apparatus according to claim 3, further comprising;
a retrieving unit configured to retrieve an access point using the external radio module activated by the processor,
wherein the display unit displays the access point retrieved by the retrieving unit as being in a client mode in the infrastructure mode.

5. The communication apparatus according to claim 3, wherein
menu items to be displayed by the display unit include WPS (Wi-Fi Protected Setup),
wherein, when a user has selected the WPS,
the processor, if an access point with which communication is to be performed with the WPS uses a 5 GHz frequency band, re-drives the interface using the USB 3.0 driver.

6. The communication apparatus according to claim 1, further comprising an image capturing unit.

7. A control method of a communication apparatus including a USB (Universal Serial Bus) interface configured to conform to a first USB standard and a second USB standard, the control method comprising:
(a) driving the USB interface according to the second USB standard,
(b) turning on an external radio module connected with the USB interface after driving the USB interface according to the second USB standard,
(c) acquiring, from the external radio module, information related to a network to be connected with after turning on the external radio module, and
(d) determining whether the network uses a 2.4 GHz band based on the acquired information related to the network,
wherein, if it is determined that the network does not use the 2.4 GHz band, the method further comprises
(e) turning off the external radio module,
(f) driving the USB interface according to the first USB standard after turning off the external radio module, and
(g) turning on the external radio module after driving the USB interface according to the first USB standard,
wherein the first USB standard is operated at 2.5 GHz and the second USB standard is operated at 240 MHz.

8. A non-transitory computer-readable storage medium storing a program which, when read and executed by a computer, causes the computer to execute the steps of a control method of a communication apparatus including a USB (Universal Serial Bus) interface configured to conform to a first USB standard and a second USB standard, the control method comprising:

(a) driving the USB interface according to the second USB standard,
(b) turning on an external radio module connected with the USB interface after driving the USB interface according to the second USB standard,
(c) acquiring, from the external radio module, information related to a network to be connected with after turning on the external radio module, and
(d) determining whether the network uses a 2.4 GHz band based on the acquired information related to the network,
wherein, if it is determined that the network does not use the 2.4 GHz band, the method further comprises
(e) turning off the external radio module,
(f) driving the USB interface according to the first USB standard after turning off the external radio module, and
(g) turning on the external radio module after driving the USB interface according to the first USB standard,
wherein the first USB standard is operated at 2.5 GHz and the second USB standard is operated at 240 MHz.

9. A communication apparatus comprising:
an interface configured to conform to a first standard and a second standard;
a processing unit configured to drive the interface according to the second standard,
wherein the processing unit
(a) turns on an external radio module connected with the interface after driving the interface according to the second standard, (b) acquires, from the external radio module, information related to a network to be connected with after turning on the external radio module, and (c) determines, based on the information acquired from the external radio module, whether the operation of the external radio module interferes with a frequency of the driving of the interface according to the second standard,
wherein, if it is determined that the operation of the external radio module interferes with a frequency of the driving of the interface according to the second standard, the processing unit (d) turns off the external radio module, (e) drives the interface according to the first standard after turning off the external radio module, and (f) turns on the external radio module after driving the interface according to the first standard.

10. A control method of a communication apparatus including an interface configured to conform to a first standard and a second standard, the control method comprising:
(a) turning on an external radio module connected with the interface after driving the interface according to the second standard,
(b) acquiring, from the external radio module, information related to a network to be connected with after turning on the external radio module, and
(c) determining, based on the information acquired from the external radio module, whether the operation of the external radio module interferes with a frequency of the driving of the interface according to the second standard,
wherein the method further comprises, if it is determined that the operation of the external radio module interferes with a frequency of the driving of the interface according to the second standard,
(d) turning off the external radio module,
(e) driving the interface according to the first standard after turning off the external radio module, and
(f) turning on the external radio module after driving the interface according to the first standard.

11. A non-transitory computer-readable storage medium storing a program which, when read and executed by a computer, causes the computer to execute the steps of a control method of a communication apparatus including an interface configured to a first standard and a second standard, the control method comprising:
(a) turning on an external radio module connected with the interface after driving the interface according to the second standard,
(b) acquiring, from the external radio module, information related to a network to be connected with after turning on the external radio module, and
(c) determining, based on the information acquired from the external radio module, whether the operation of the external radio module interferes with a frequency of the driving of the interface according to the second standard,
wherein the method further comprises, if it is determined that the operation of the external radio module interferes with a frequency of the driving of the interface according to the second standard,
(d) turning off the external radio module,
(e) driving the interface according to the first standard after turning off the external radio module, and
(f) turning on the external radio module after driving the interface according to the first standard.

* * * * *